US006497107B2

(12) United States Patent
Maisotsenko et al.

(10) Patent No.: US 6,497,107 B2
(45) Date of Patent: Dec. 24, 2002

(54) METHOD AND APPARATUS OF INDIRECT-EVAPORATION COOLING

(75) Inventors: Valeriy Maisotsenko, Aurora, CO (US); Leland E. Gillan, Denver, CO (US); Timothy L. Heaton, Arvada, CO (US); Alan D. Gillan, Denver, CO (US)

(73) Assignee: Idalex Technologies, Inc., Denver, CO (US)

( * ) Notice: Subject to any disclaimer, the term of this patent is extended or adjusted under 35 U.S.C. 154(b) by 0 days.

(21) Appl. No.: 09/916,800

(22) Filed: Jul. 27, 2001

(65) Prior Publication Data

US 2002/0038552 A1 Apr. 4, 2002

Related U.S. Application Data

(60) Provisional application No. 60/221,264, filed on Jul. 27, 2000.

(51) Int. Cl.[7] .............................. F28C 1/00; F28D 5/00; F28D 17/04
(52) U.S. Cl. .............................. 62/121; 62/305; 62/309; 62/310; 62/314
(58) Field of Search .......................... 62/121, 305, 309, 62/310, 314

(56) References Cited

U.S. PATENT DOCUMENTS

| | | |
|---|---|---|
| 2,174,060 A | 9/1939 | Niehart |
| 4,350,570 A | 9/1982 | Maisotsenko et al. |
| 4,976,113 A * | 12/1990 | Gershuni et al. ............. 62/314 |
| 4,977,753 A * | 12/1990 | Maisotsenko et al. ........ 62/121 |
| 5,187,946 A * | 2/1993 | Rotenberg et al. ............ 62/314 |
| 5,212,956 A * | 5/1993 | Tsimerman ..................... 62/94 |
| 5,301,518 A * | 4/1994 | Morozov et al. ............. 62/305 |
| 5,315,843 A * | 5/1994 | Morozov et al. ............. 62/309 |
| 5,349,829 A * | 9/1994 | Tsimerman ................... 62/314 |
| 5,351,497 A | 10/1994 | Lowenstein |
| 5,692,384 A | 12/1997 | Layton |
| 5,860,284 A * | 1/1999 | Goland et al. ................. 62/94 |
| 6,050,100 A | 4/2000 | Belding et al. |
| 6,338,258 B1 * | 1/2002 | Lee et al. ..................... 62/310 |

FOREIGN PATENT DOCUMENTS

| | | |
|---|---|---|
| RU | 641260 | 1/1979 |
| RU | 690271 | 10/1979 |
| RU | 979796 | 12/1982 |

OTHER PUBLICATIONS

J. Marsala, A. Zografos, D. Bartz, and S. Feldman—Liquid Desiccant Technology Development Jun. 1991 TR4438–031–91 Gas Research Institute—Contract No. GRI–5087–243–1590.

A.I. Zografos and J. Marsala Mass Transfer in Parallel Plate Type Conditioners 1991 ASME/JSME Therman Engineering Proceedings; vol. 4—ASME 1991.

Andrew Lowenstein, Ph.D. The Seasonal Performance of a Liquid–Desiccant Air Conditioner 1995 pp. 679–685 Ashrae Transactions: Symposia 1995.

Jorge L. Martinez and Arshad Y. Khan Heat and Mass Transfer Performance Analysis of a Compact, Hybrid Liquid Desiccant Absorber 1996 pp. 2033–2038—(Footer) 0–7803–3547—3–7/16 (No. at top of page is 96418)).

* cited by examiner

Primary Examiner—William C. Doerrler
Assistant Examiner—Filip Zec
(74) Attorney, Agent, or Firm—Dorr, Carson , Sloan & Birney, P.C.

(57) ABSTRACT

The within invention improves on the indirect evaporative cooling method and apparatus by making use of a working fluid that is pre-cooled with and without desiccants before it is passed through a Wet Channel where evaporative fluid is on the walls to take heat and store it in the working fluid as increased latent heat. The heat transfer across the membrane between the Dry Channel and the Wet Channel may have dry, solid desiccant or liquid desiccant and may have perforations, pores or capillary pathways. The evaporative fluid may be water, fuel, or any substance that has the capacity to take heat as latent heat. The Wet Channel or excess cooled fluid is in heat transfer contact with a Product Channel where Product Fluid is cooled without adding any humidity. An alternative embodiment for heat transfer between adjacent channels is with heat pipes.

40 Claims, 27 Drawing Sheets

METHOD AND APPARATUS OF INDIRECT-EVAPORATION COOLING

The applicant claims priority of Provisional patent application Ser. No. 60/221,264, filed Jul. 27, 2000, entitled "METHOD OF INDIRECT-EVAPORATION COOLING", inventors, Valeriy Maisotsenko, et al.

FIELD OF THE INVENTION

1. The present invention relates to methods of indirect-evaporation cooling of fluids and to heat exchange apparatus for affecting these methods.

2. The invention can be used for air conditioning, as well as cooling liquids and gases in different technological processes. It can be used to cool materials that can be conveyed along the heat transfer surfaces of the apparatus by methods other than fluidization.

BACKGROUND

The use of Evaporative methods to cool gases is well-known. The use of adjacent channels or heat transfer services to allow an evaporation in one channel to provide cooling for material in the second channel is also well-known, see. Niehart 2,174,060.

The methods and apparatus to cool air through evaporation have proved useful over many years. However they have certain drawbacks and limitations due to their designs.

There is known in the art a method of indirect-evaporation cooling of air, comprising cooling the flow of outside air over a heat exchange apparatus (USSR Patent No. 979796).

The outside air is pushed over a heat transfer surface, or moisture proof plates of the Dry Channel. The apparatus is comprised of a number of vertical moisture-proof plates which divides alternately Dry Channels and Wet Channels. At the outlet from the Dry Channel the flow of air is divided into two flows, namely, the cooled product flow and working flow to the evaporation or wet channel. The cooled flow goes to the consumer, and the evaporative flow is directed in counter flow of the Dry Channel, in the Wet Channel. The flows are controlled by the creation of aerodynamic resistance at the Dry Channel outlet. The heat transfer between the dry and Wet Channels causes heat to be drawn out of the outside air in the Dry Channel across the heat transfer surface and into the evaporation of the water in the Wet Channel. Cooling the air by the heat transfer surface occurs from the inlet of the Dry Channel to the exit. This allows air temperatures at the end of the Dry Channel to approach the dew point temperature of the air entering the Dry Channel.

The essential disadvantages of the described method and the apparatus for effecting same are: 1) the Product Fluid can not be cooled even in an ideal case lower than the temperature of the dew point of outside air; 2) the impossibility of cooling materials other than air or gas and; 3) difficult to realize cooling process for use in vehicles.

In addition to the above indirect-evaporation cooler there is a conceptual method and design apparatus for Evaporating and Cooling Water disclosed in Maisotsenko patent USSR Patent No. 690271 and USSR Patent No. 641260 where by single pass of air is used to cool water. In this method and apparatus the outside air flow is pushed down a Dry Channel with a heat transfer surface between the dry and wet channels and turned 180 degrees at the end of the channel and pushed up in counter flow across the water wetted heat transfer surface. Evaporation of water from the Wet Channel then draws heat across the heat transfer surface cooling the air in the Dry Channel and also cooling the water in the Wet Channel. Enough water is drawn over the Wet Channel to allow evaporation and collection of cooled water at the bottom of the channel which becomes the cooled product. Cooling the air in the Dry Channel allows for water temperatures at the bottom of the channel to approach the dew point temperature of the outside air.

The essential disadvantages of the described method and the apparatus for effecting same are: 1) the water being cooled can not be cooled even in an ideal case lower then the dew point temperature of outside air; 2) The ability to cool only water; 3) This process does not use an induced draft exhaust system and; 4) The description of the materials and accessories needed to design and make the cooler make for impractical application.; 5) Cooling potential of this evaporation process is limited; 6) The heat transfer rate in the channels, especially the Dry Channels is low.

Rotenberg 5,187,946, which is copied from Russian patent 2046257 Maisotsenko, there is disclosed a Wet-Dry Channel heat exchange system with an evaporative cooler. This does not address the issues of the limitation of ambient air, the limited efficiency of this design or the separate product channel being cooled by the wet channel.

The use of desiccants in evaporative coolers is common, see Belding 6,050,100, where the desiccant dehumidifies the air, both the air that goes to a dry side of an indirect evaporative cooler and the air that is separated and sent to the wet side to evaporate the water and cool the dry side air flow for later use. The desiccant is by way of a desiccant wheel. Additionally, the use of the desiccant and separately treating the two air streams in Belding yields a primary stream for the dry side that is more humid and cooler than the drier and warmer secondary stream that is used for the wet side.

Unlike the disclosed invention herein, Belding does not use the same flow for the dry and wet side flows. As a result, the cooling is not great and there is no separation of product so only air can be cooled. Finally, the method requires complex components and separate treatment of the flows with added mechanics and energy requirements.

Lowenstein in 5,351,497 and his paper on "Seasonal Performance of a Liquid Desiccant Air Conditioner" ASHRAE Symposia 1995 makes use of liquid desiccant on the dry side of an indirect evaporative cooler. Similar to Belding, the dry side air is separate and is the cooled product air.

Lowenstein uses the liquid desiccant to dehumidify the desired air flow for a living area, and the evaporative cooling is used to aid in absorbing the latent heat that is released by the dehumidification.

Lowenstein's absorber, throughout makes use of liquid desiccant for dehumidifying air, does not make use of the unique feature of the within application. It does not give the advantages of lower temperature and controlled humidity.

Separate absorbers, using liquid desiccants were also discussed in Martinez and Khan, "Heat and Mass Transfer Performance Analysis of a Compact, Hybrid Liquid Desiccant Absorber", 1996 IEEE. The discussion teaches a result contrary to the within disclosure that such an absorber could not be used alone to condition and cool air for living space.

The objectives of this invention is to make an improved method and apparatus for evaporation of a liquid to provide cooling for gases, liquids or other materials. The invention allows for cooling to a lower temperature than other methods. Its further objective is to make use of the cool product gas flow to cool other materials in an improved way without adding vapor or humidity to the product.

Further objectives of the invention is to make use of drying agents or desiccants to enhance the efficiency of the invention and its ability to cool. A further innovation is to make use of solid desiccants on a membrane or substrate to allow transpiration of vapor and fluid that is absorbed in the dry channel by the desiccants and then released in the wet channel by evaporation processes and thus cool the membrane and the dry channel.

The water vapor transpires through the solid desiccant and membrane.

Additional objects of the invention are to allow the desiccants to be concentrated and recycled to provide more efficiency to the cycle. The invention uses the recycling of the desiccant in combination with the use of the desiccant as part of the wet channel to accomplish both objects.

SUMMARY OF INVENTION

The main object of the invention is to provide an economical and environmentally safe method of cooling by indirect-evaporation and heat exchange apparatus, wherein the Product Fluid can be cooled to or lower than the dew point temperature of outside air. The object set forth is solved in different ways by using a core piece of heat and mass exchange apparatus in combination with the cooling process or processes that are desired. This core piece of apparatus can deliver cooling fluid by either producing cooled liquid or cooled gas.

The core of the apparatus passes Working Air along a Dry Channel with one side of a heat exchange membrane, then turns the flow 180 degrees and passes this same flow along a Wet Channel in counter flow with the same heat transfer membrane but on its opposite side. Evaporation cooling in the Wet Channel cools the Working Air in the Dry Channel. The Product to be cooled can be: 1. By the passing of the Product to be cooled through a third channel in heat transfer contact with the Wet Channel. 2. An excessive amount of Evaporative Liquid, (being drained off after cooling and passed through a Product Heat Exchanger like water, liquid desiccant, or liquid fuel 3, or other volatile liquid under the applicable pressures). A portion of the Working Air may be drawn out of the apparatus and used directly as a Product.

The unit can be built in a bank of channels. When the Product to be cooled is set in a channel along side the Wet Channel, it may also be in heat transfer contact with the Dry Channels due to the succession of units.

The fluid exiting the Wet Channel surface is considered the Exhaust. The difference in the total energy between the Working Air entering the Dry Channel and leaving the Exhaust is the Product cooling energy available. This is generally measured by the difference in enthalpy and flow. The Exhaust enthalpy is ideally limited by the Working Air temperature entering the Dry Channel at its corresponding saturation enthalpy.

The importance of pre-cooling the air before turning it to the Wet Channel and then obtaining lower temperatures can be understood by realizing that the Wet Channel Working Air starts at the lowest temperature attained in the Dry Channel, generally approaching the dew point temperature of the outside air. Before the Working Air enters the Dry Channel it's temperature is generally at the outside air temperature. In all indirect-evaporation cooling apparatus for cooling outside air, other than described here, Working Air (used in evaporation) and product air temperatures start at the same point, the outside air temperature, forcing the temperature to approach the higher wet bulb temperature rather than the dew point temperature. Much lower temperatures can be realized with the use of desiccants to dry air in the Dry Channel, or by pre-cooling before going to evaporation as set out here, and lower the dew point temperature attainable.

The main differences between this apparatus and method and previous art are: 1. The means to create a workable method that will function in industry that is both efficient and economical to manufacture. 2. The wide use of fluid types in all channels. The Evaporative Liquid used in the Wet Channel for transpiration cooling can be any thing that will evaporate into the air under the ambient pressure and temperature. The Dry Channel and or the Product Channel of this method can also be a drying channel with the use of a desiccant on the heat exchange surface, or on a different surface within the Dry or Product channel, either liquid or solid to dry the air out while being cooled at the same time. This core design allows for many different types of fluids to be used and effective cooling at low cost. 3. The core method allows for a wider variety in design considerations for cooling different types of products. 4. The heat transfer surfaces on the walls can be varied from impermeable, to micro-sieve, or to perforated. Perforations or capillary channels allows for transpiration conductively from the Dry Channel to the Wet Channel. This has advantages in heat transfer and in efficiencies.

There are many variations that can be used with this core method of the invention that are described here after. The variations fit the wide variety of applications the core method can be used in.

It is always advantages to wet both surfaces of the Wet Channel, both the Dry Channel-Wet Channel heat transfer membrane or wall and the Wet Channel-Product heat transfer membrane or wall, (when a Product Channel is used,) to improve the heat transfer rate.

In high humidity climates it is sometimes advantages to heat the outside air entering or moving through the Dry Channel. At a higher heat, with no change in humidity, there is a greater latent heat capacity due to the ability to take on more moisture before saturation. It is approximately five times faster than the energy spent to gain higher temperatures.

Drying the air could be with desiccants such as Lithium chloride, bromide, calcium chloride, glycol, triethylene glycol etc. This allows cooling below the dew point temperature of outside air when combined with desiccants before or in the Dry Channel because it reduces the moisture content and thus increases the latent heat potential capacity.

In addition liquids, in the applicable pressure and temperature, with dew point temperatures less than that of water in air, such as gasoline, can be used in the Wet Channel. The fluid may be any suitable fluid that has a high vapor pressure at the ambient temperature and pressure so as to enhance the evaporation and thus take the heat of transformation from the remaining fluid.

The Working Air can be dried with a desiccant and then passed through the Dry and Wet Channels. This has the dramatic effect of reducing the temperature of the Working Air and therefore the minimum temperatures that can be obtained. The Product cooling available is the difference between the total energy, enthalpy and flow rate, of the hot Working Air in the Dry Channel and the total Exhaust energy leaving the Wet Channel.

The method can be effectively used to cool water for power plants and other typical cooling applications with return water temperatures closer to the dew point temperature of the outside air rather than the wet bulb temperature.

In this case the Working Air is precooled in the Dry Channel and humidified in the Wet Channel. In many uses the temperature of the water to be cooled is warmer than the outside air. This added heat works to the coolers advantage as the temperature of the Working air will be increased which will also increase the available cooling energy. The use of desiccants to dry the air would lower the temperatures of the cooling water further as this is a greater capacity.

The liquid desiccant can be placed in the Dry Channel increasing the heat transfer rate from air to desiccant and desiccant to the heat transfer surface by five to ten times. This allows: 1. The temperature of the exhaust air to more closely approach the air temperature entering the apparatus. 2. The relative humidity of the exhaust to approach the saturation point, and, therefore, increases the energy available for cooling of the product.

Heat pipes can be used between the Wet and Dry Channels, and the Product Channel as well, if desired, creating the need for only one channel for each. This allows for easier configuration of a purely counter flow arrangement of the method.

In addition, using a desiccant in the Dry Channel provides continuous cooling of the desiccant and therefore increasing its absorption capacity and rate, drying the air faster and to a lower temperature.

Regeneration of the desiccant can take place within the core method with the use of a porous heat exchange panel between the Dry and Wet Channels. This panel would be designed to allow water absorbed by the desiccant to be drawn directly to the waterside through the panel by means of: 1. The lower pressure on the waterside. A pressure drop does need to be created between where the Dry Channel ends and the Wet Channel begins. The dry side may have forced draft fans and the exhaust may have an induced draft fan to create a larger pressure drop. 2. By the lower density of water on the waterside causing the water in the desiccant to want to move to the Wet Channel. 3. By the direction of the heat flow to the waterside. The porosity may be to water in liquid or vapor phase.

Depending on the Product to be cooled the Product Channel could have a desiccant used for drying and cooling the product as well.

The regeneration process does have a small loss in energy due to de-mixing of water moving from the desiccant to the Wet Channel, from liquid to liquid, but not going through a phase change. When the exhaust air absorbs this water a vapor change would take place creating a positive energy flow for cooling. The heat transfer rate will be larger due to the lack of a boundary layer in the channel separation wall and the direct connection of water to both sides of the membrane.

Solid desiccants can be used for the heat transfer surface in the regeneration process. Dry desiccants have the advantage of no heat loss from cooled desiccant flowing from the Dry Channel and carrying off some of the cooling energy. However the heat transfer rate from the Working Air to the desiccant is less with a dry desiccant. This desiccant regeneration and drying system could also be used in the Product Channel.

The core method can be efficiently used for air conditioning and cooling systems where liquid fueled engines are used such as in a vehicle. The Evaporative Liquid in the Wet Channel becomes fuel. The Dry Channel takes in outside Working Air for pre-cooling and passing through the Wet Channel. The Product Channel in heat transfer contact with the Wet Channel is cooled. In addition, it is possible to use a solid or a liquid desiccant in the Dry Channel, and liquid fuel and water to the working air in the Wet Channel simultaneously increasing the potential energy of cooling, due to the increased vapor pressure. In addition the fluid in the Dry Channel can be heated for the Dry Channel, before, during or at the end, with exhaust gases from the engine to provide additional vapor potential and thus, latent heat capacity of the working air and cooling product when water is being added to the Wet Channel with the liquid fuel. The desiccant can be re-concentrated with the heat source being the exhaust gas of the engine.

The addition of water in the Wet Channel will produce water vapor in the fuel-air mixture, which is directed to the engine, and it helps to improve the combustion process in the engine of a vehicle.

With vehicles that do not use enough fuel to cool a vehicle, or electric vehicles, core method with water/desiccant system can be used.

Creating a lower pressure in the Wet Channel will increase the vapor drive from water to the air. Increasing the pressure in the Dry Channel will increase the vapor drive to the desiccant. Pressurizing the Dry Channel and pulling a partial vacuum on the Wet Channel will require the insertion of a baffle between the channels to regulate the Working Air flow rate.

Recycling can be accomplished by use of liquid desiccants. Diluted liquid desiccants can be used in the Wet Channel with dry air to remove the water from the desiccants. This concentrated desiccant can then be used to dry the air either within the Dry Channel or outside the apparatus. To create a larger vapor drive difference between the Wet and Dry Channels, a pressure drop must be created between them. In addition the Dry Channel may need to have heat added before, during or after entering it and the Wet Channel may need to have water added to a surface both causing a greater vapor drive potential between the channels.

The method may be used to create cool concentrated desiccant for drying air and then using a more conventional cooling system in another process.

The core method can be efficiently used when working air is redirected from the Dry Channel into and through the Wet Channel, for example, through a plurality of spaced perforations or permeable pores formed in the heat exchange surface.

It can help to increase the coefficient of heat transfer between flows of working air in the Dry and Wet Channels. Also, it can help to transport absorbed water (when we use solid desiccant material) from the Dry to the Wet Channel.

The working heat exchange apparatus for effecting the above-described method will have: 1) A jacket with inlets and outlets for the Product Fluid and the Working Air or other fluids respectively. 2) The Product Channels for the Product Fluid. 3) The communicable Dry and Wet Channels for the Working Air with a heat exchange plate with or without perforations or pores. 4) The Product and Dry and Wet Channels are alternated and separated with plates. 5) A liquid distributor for channels with moisture on the walls such as a liquid desiccant or water. 6) Collecting trays for this liquid. 7) Valves for proper regulation of fluids in the channels. 8) Other components needed for specific function and operation of the apparatus, if pressure regulation is needed.

Counter flow is theoretically the most efficient design, however there are many designs that can be used to produce a more economically viable units using cross flow or some other combination of flow.

The plate or membrane, which is the heat exchange surface between the channels, can be made of wick, plastic, metal or solid desiccant materials or compositions of these materials.

While the description of this apparatus incorporates vertical channels for liquid wetting of airflow throughout the channel, there are various methods of moving liquids such as wicking, high air or vapor velocity, enough partial vacuum to lift the fluid, inclined slopes, etc. Depending on the application and design, the apparatus can be used with panels turned from horizontal to vertical.

DESCRIPTION OF THE DRAWINGS

The invention will now be described by way of preferred exemplary embodiment thereof with reference to appended drawings, wherein similar parts have the same reference numerals and in which:

FIGS. 1 to 9 contains: the Product Channel-1, the Product Fluid-2, Dry Channel-3, the Working Air-4, the Wet Channel-5 membranes, or walls-6 and 7 have heat exchange surfaces-8 and 9, moving film of Evaporative Liquid such as water or a wet surface but non moving film such as with a wick-10, the induced draft fan-11, a forced draft fan 74, pipes-41, 42, desiccant 46 and baffle 73.

FIGS. 16–22 contain: the Product Channel 1, the Product Fluid 2, Dry Channel 3, the Working Air 4, the Wet Channel 5 membrane, or walls 6 and 7 have heat exchange surfaces 8 and 9, moving film of liquid such as desiccant 10, the induced draft fan 11 and forced draft fan 74, the mass and heat exchange apparatus 33 or air dryer 33, valves 34, 35, 36, 37 and 38, the heat exchange apparatus 39, the apparatus for direct or indirect cooling 40 and 54, pipes 41, 42, 43, 44, 48 and 50, duct 45, pump 49 and 51, Dry Channel tray 52, Wet Channel tray 53, and baffle 73.

DETAILED DESCRIPTION OF THE INVENTION

Figure 1:
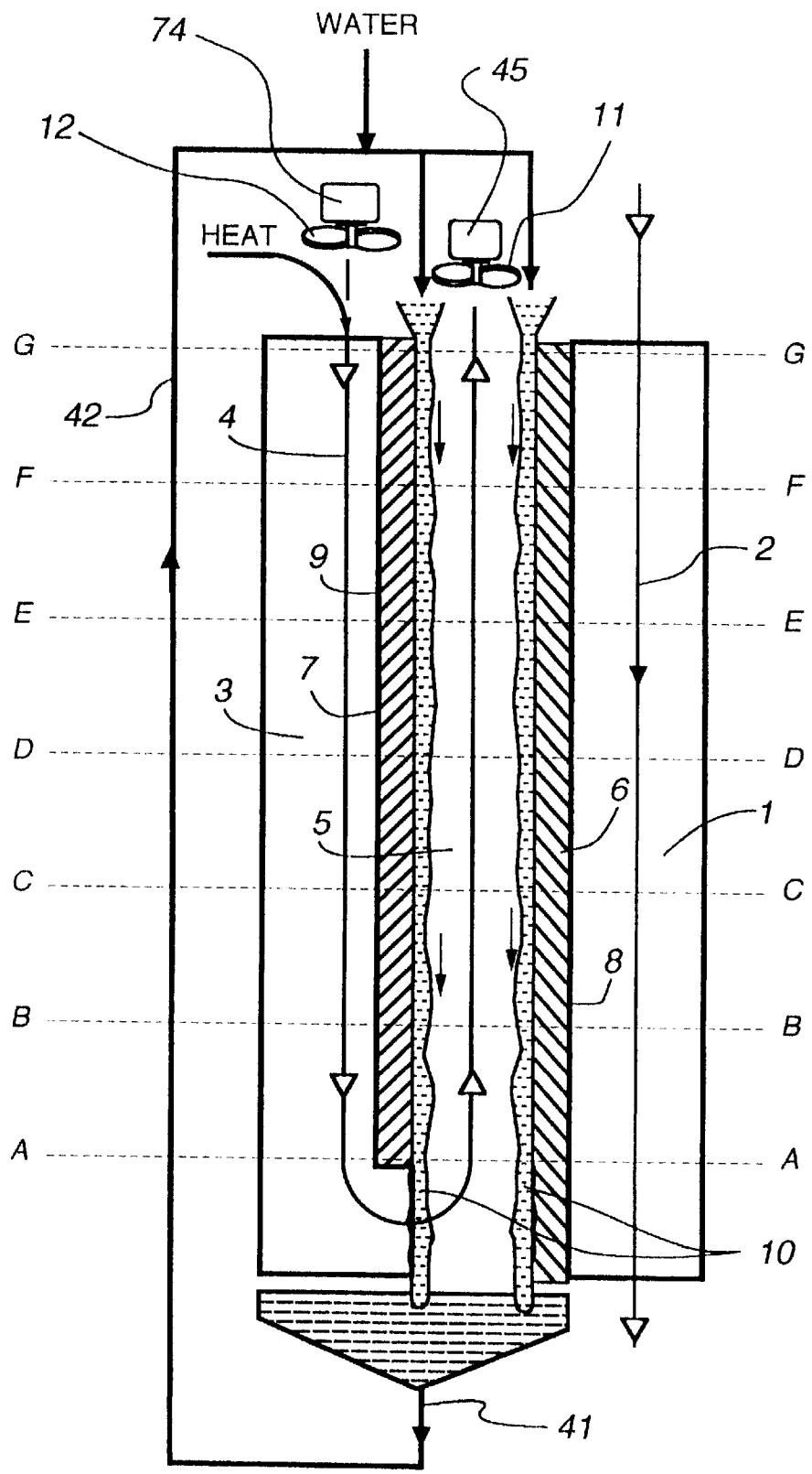
FIG. 1 is a flow diagram of the present method for indirect-evaporation cooling where by the Product 2 is cooled in the Product Channel 1 along side the Wet Channel 5 and when multiple channels are used, the Dry Channels 3 of the adjacent cooling unit as well.

FIG. 1 illustrates a flow diagram with a Product Channel 1 used for cooling a Product 2. The Product Fluid 2 is fed along the Product Channel 1 of the heat exchange apparatus, and the Working Air 4, for example, outside air is fed along the Dry Channel 3. The Wet Channel 5 is arranged in heat transfer contact with Dry Channels 3 via membrane 7. The membrane 7 has heat exchange surface 9, limiting the corresponding Dry Channel 3. The reverse sides of this membrane 7 are wetted with a moving film of the Evaporative Liquid, for example, water 10 using any available method. The membranes 6 and 7 can be made of wick, plastic, metal, solid desiccants, micro sieve, etc. materials or composition of these materials. It is understood that the term membrane is used, but any structure that performs the function of separating Channel 3 from Channel 5 or the working air from the product channel is suitable. The Working Air 4 is drawn to the induced draft fan 11 mounted at the outlet of the Wet Channel 5 or in some cases the air is pushed through by forced draft fan 74. The Product Fluid 2 is directed along the Product Channel 1, where it is cooled without changing its moisture content. At the same time the Working Air 4, is directed concurrently with respect to the Dry Channel 3 in contact with a heat exchange surface 9. In so doing, the Working Air 4 is cooled, due to the heat absorption due to evaporation occurring in the Wet Channel, without any change to the moisture content of the Dry Channel air and then it is turned to the Wet Channel 5, where it flows counter currently in contact with the moist surfaces, for example, with wick or capillary-porous material being wetted by Evaporative Liquid 10. As the Working Air 4 passes along the Wet Channel 5 it is heated, moistened and is preferably drawn by the induced draft fan 11 to the atmosphere or as in some cases forced by fan 74. As the Working Air 4 passes along the heat exchange surface 9, it is cooled as a result of the heat exchange by the same flow passing along the surfaces of a Wet Channel 5 that are wetted by the moving Evaporative Liquid 10. In the Wet Channel 5, latent heat of evaporation is removed which results in the cooling of Working Air 4 on the wet surface and eventually owing to heat transfer via the membrane 7 giving pre-cooling of Working Air 4 in the Dry Channel. Should outside air taken directly from the atmosphere be used as the Working Air 4, passing through the Dry Channel 3, then by the time it has passed through the Dry Channels and contacts the moisture in Wet Channel 5 it will have cooled down to near the dew point temperature of the Working Air. In so doing, the Product Fluid 2 can be cooled in an ideal case to the dew point temperature by the evaporative action in the Wet Channel taking latent heat from the heat exchange membrane between the product and the Wet Channel. In actual fact, this temperature will be still higher due to the Product Channel membrane 6 thermal resistances.

It follows from FIG. 1 that the length of the Dry Channel 3 is equal to that of the Wet Channel 5, although alteration and various relations of these channels' lengths are possible.

To increase the cooling potential, the Working Air 4 can be heated before, during or after it's passing along the Dry Channel 3, (FIG. 1). Increasing temperatures of the Working Air 4, before, during and after passing along the Dry Channel 3, gives the possibility to increase latent heat capacity, and thus, the efficiency of the exhausted Working Air 4 into the Wet Channel 5. This is due to the latent heat having a larger effect on the enthalpy than sensible heat with a greater effect as the temperature rises.

As the airflow passes along any surfaces, aerodynamic losses of the head always occur due to resistance. Therefore, in the within embodiments, the value of the head of the Working Air 4 will decline as it moves along the heat exchange surface 9 in the Dry Channel 3, particularly when it turns 180 degrees and then as it travels over the wetted surfaces of the Wet Channel 5. This pressure drop will cause a lowering of the vapor partial pressure of the air and in turn will reduce the dew point temperature of the air. Sometimes it is attained through the use of resistance in the channels such as with corrugated panels on small channel width, with baffles, valves, liquid flow etc. This, in turn, will facilitate more effective evaporation of water vapor into this air to increase the cold production process of transpiration cooling.

In the method according to the invention it is expedient that additional aerodynamic resistance be created in order to enhance the evaporation cooling efficiency. Additional power consumption for the fan will be much lower in many cases than the value of the positive effect obtained with an increased evaporation of water into Working Air 4. It is possible to provide additional aerodynamic resistance and disruption of stagnant surface layers of working fluids, for example, using various perforations or pores or by heat exchange surfaces, by placing them in the flow path. It is also possible to provide aerodynamic resistance by narrowing this flow path, placing dampers in its path or restricted pathways.

This yields a double advantage of a lower pressure in the Wet channel 5 increasing the evaporation rate, and increasing the heat transfer rate in the Dry channel 3 where there is a lower heat transfer rate as compared to the Wet Channel between the dry Working Air 4 and heat transfer surface 9. In addition to the alteration of the vapor pressure, the partial vacuum which is created by the induced draft fan 11 can be used to increase the capillary action or passage through perforations or pores, in some designs where wicking is used between the Dry and Wet Channels or in the distribution of the liquid desiccant.

The invention makes use of a heat transfer membrane that separates two portions of a working gas flow channel. As seen in FIG. 1 the gas depicted as 4 flows down channel 3 which we designate the dry channel and up channel 5 which we designate to be the wet channel. The heat transfer membrane 7 is comprised of a thin material that allows the transmission of heat across its horizontal width because of its thin construction. The heat transfer membrane 7 generally, through a given thickness does not have good heat transfer ability relative to materials such as metal. However, due to its thin construction of the wall thickness between channel 3 and channel 5, heat is able to transfer easily and quickly from channel 3 to channel 5. The heat at any given location on the membrane does not readily move along the surface of the membrane because of the materials' high resistance to heat transfer, in a direction other than across the thin membrane.

The result of this is that temperatures will vary along the height or vertical distance shown in FIG. 1 and depicted in reference levels AA, BB, CC, DD, EE, F.F., and GG. The choice of the wall material, whether it is relatively impermeable to moisture or able to transmit water or vapor as a micro-pore or perforated membrane, requires this heat transferability parameter. The particular material may be paper, plastic such as Tyvek, sieve webbing or any common matter meeting these parameters.

Within wet channel 5, water or other fluid is on the walls of the wet channel 5. The passage of the gas or working fluid 4 from its source 74 through the dry channel 3 and into channel 5 and is shown as counterflow. The wet channel 5, which has fluid on its walls, allows for the use of evaporation and the heat of transformation or evaporation to be transferred from the fluid, thus cooling the fluid. The exhaust gases of the working fluid exits at 75. The gases in the wet channel 5 due to evaporation will cool the fluid and in turn the membrane 7 which will in turn cool the working gas in channel 3, the dry channel.

The working gas 4 in the wet channel will continue taking the vapor of the evaporation of the fluid until it reaches or nears its saturation point. FIG. 1 at AA would be one temperature in the exhaust or wet channel side. That temperature would be transmitted through the membrane 7 to its counterpart in the dry channel side. Similarly this occurs at points BB and CC and through the various levels of FIG. 1. At AA the working fluid at that point has had the least amount of time to pickup evaporative vapor and thus the least opportunity to cool the fluid that would be instantaneously located at AA.

As you proceed further up the wet channel from BB to CC and on, the temperature due to evaporation, will continue to be cooled at each location.

Simultaneous with the continued evaporation which will cool the fluid at the level that the evaporation occurred, the fluid that has been cooled at a given level will be moving downward as it moves. The additional effects of the fluid which has been cooled by evaporation and is moving downward is that fluid that had been at GG and cooled by evaporation through time will move downward to DD where further evaporation will occur and onward to AA and if any excess fluid is left it exits the system. This flow allows the fluid at the level where it is cooled by evaporation through heat transfer to take heat from the dry channel 3 at that point and provide the fluid latent heat and additional vapor pressure for further evaporation. Then further evaporation will cool the liquid more. Thus, the fluid continues to provide evaporation and take off heat of transformation. Further the lower temperature that had been created at FF by evaporation will be transmitted by heat transfer to the dry channel and by flow downward to the lower levels of the membrane 7 where further evaporation will occur which, in turn, will further cool the concurrent side of the dry channel across the thin membrane 7. Thus the cumulative impact at AA will be from evaporation that has occurred above it and the transmission of that cooled fluid down to the point AA as well as the evaporation that occurs at point AA. At GG the temperature or cooling will occur at GG solely by way of evaporation. But by the working fluid being cooled, the stable temperature at GG will be lower than outside ambient temperature.

The effect on the dry channel portion of the working fluid flow 4 is that the working fluid in the dry channel will be cooled at GG because of the cooler temperature across the membrane 7. Similarly this cooling will continue to occur to the working flow 4 as it progresses downward from level GG, FF, DD, CC, BB and AA. Thus the dry channel flow will be precooled before it turns at the bottom of FIG. 1 and proceeds upward through the wet channel. Due to the fall of the cool fluid in the wet channel along that side of the membrane 7 the lowest temperature will occur at the AA position. The total system will cool until it reaches a stable temperature. Likewise because of the heat transfer and the pre-cooling that has occurred from levels GG through the dry channel, flow of the working fluid 4 will also be at its lowest temperature at level AA.

Also shown on FIG. 1 is a third channel 1 that has a flow of product gas or fluid. There is a heat transfer membrane 6 that separates the wet channel from the product channel 1. Similar to the membrane 7 this membrane is also of a material that does not provide good heat conductivity normally but because of the thin construction of the wall separating channel 1 from channel 5 heat transfer readily occurs. This material, aside from meeting the environmental consideration of the Wet Channel and the Product Channel, can be of any material, just like membrane 7. The temperature transfer vertically or along the surface of the membrane 6 does readily occur. The flow of the product air is again counter to the flow of the working gas in the wet channel, but it can be of any orientation. Again this provides the maximum amount of cooling to the product gases. At point GG gases and the wet walls in the wet channel have been cooled by the evaporation . This cools the liquid on the surface of the membrane 7 and 6. The membrane 6 in turn cools the product in channel 1. At point AA the product is being cooled to its maximum similar to the cooling that occurred in the dry channel because of the combination of the evaporation at point AA, the pre-cooling of the Dry Channel air and the movement of cooled fluid down from positions above. It is understood that the orientation of the FIG. 1 and the use of the terms vertical and up and down are descriptive and not limiting. It is understood that the flow of the fluids in the wet channel may be accomplished by means other than gravity.

Figure 2:
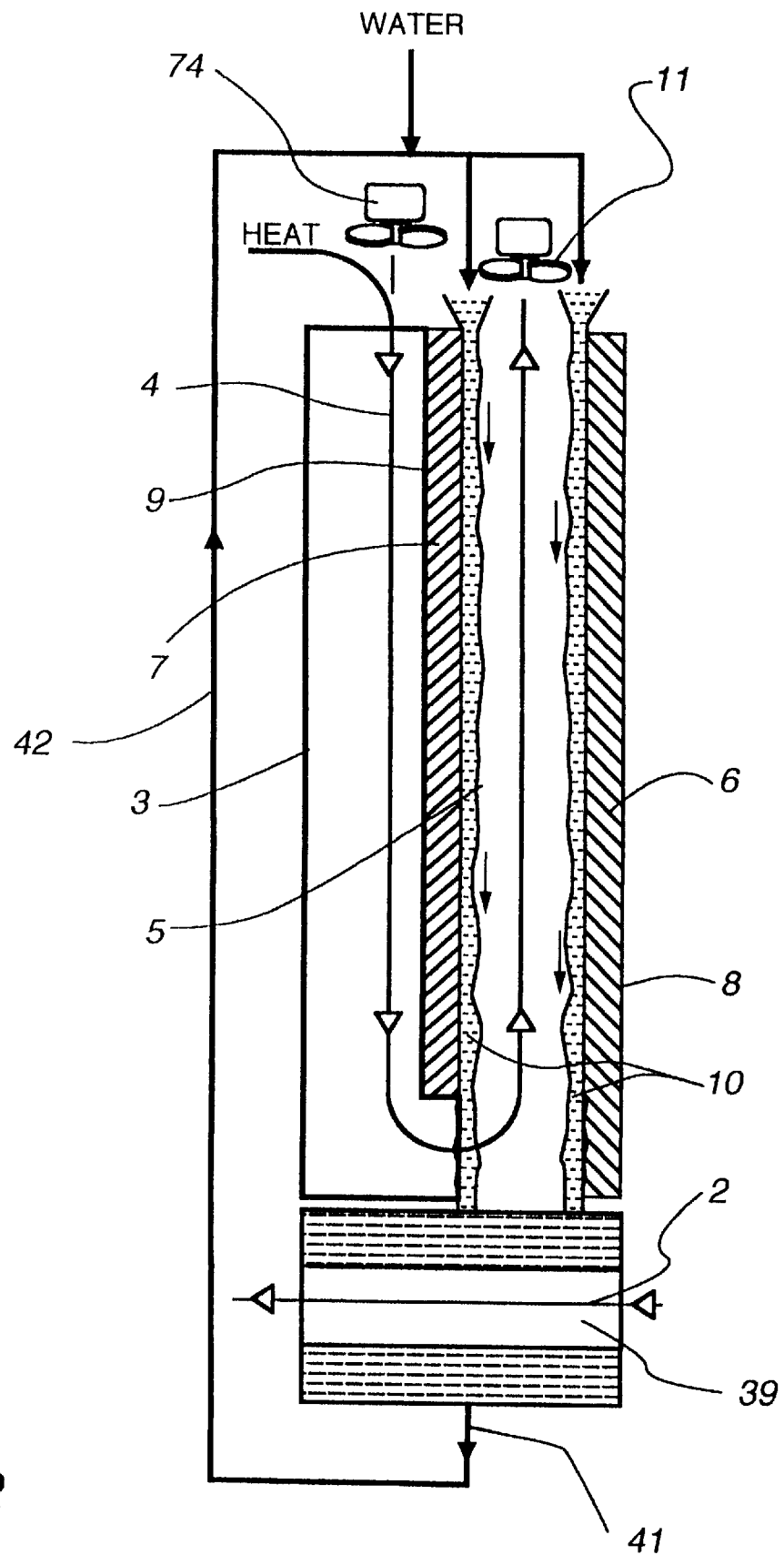
FIG. 2 is a flow diagram of the present method for indirect-transpiration cooling where by the Product 2 is cooled with the use of excess Evaporative Liquid 10 such as water that has been cooled and is used to cool the Product 2 in a separate Product Heat Exchanger 39.

FIG. 2 illustrates a flow diagram of the present method, where excess Evaporative Liquid such as water 10 flows down along the walls 6 and 7 of the Wet Channel 5 to the Product Heat Exchanger 39 and cools Product Fluid 2 flowing through it.

In applications where the method of cooling the product does not use excess evaporative liquid, the flow of fluid will be just equal to the maximum evaporation occurring during the wet channel phase. Wicking to the entire extent of the wet channel would be ideal.

Figure 3:
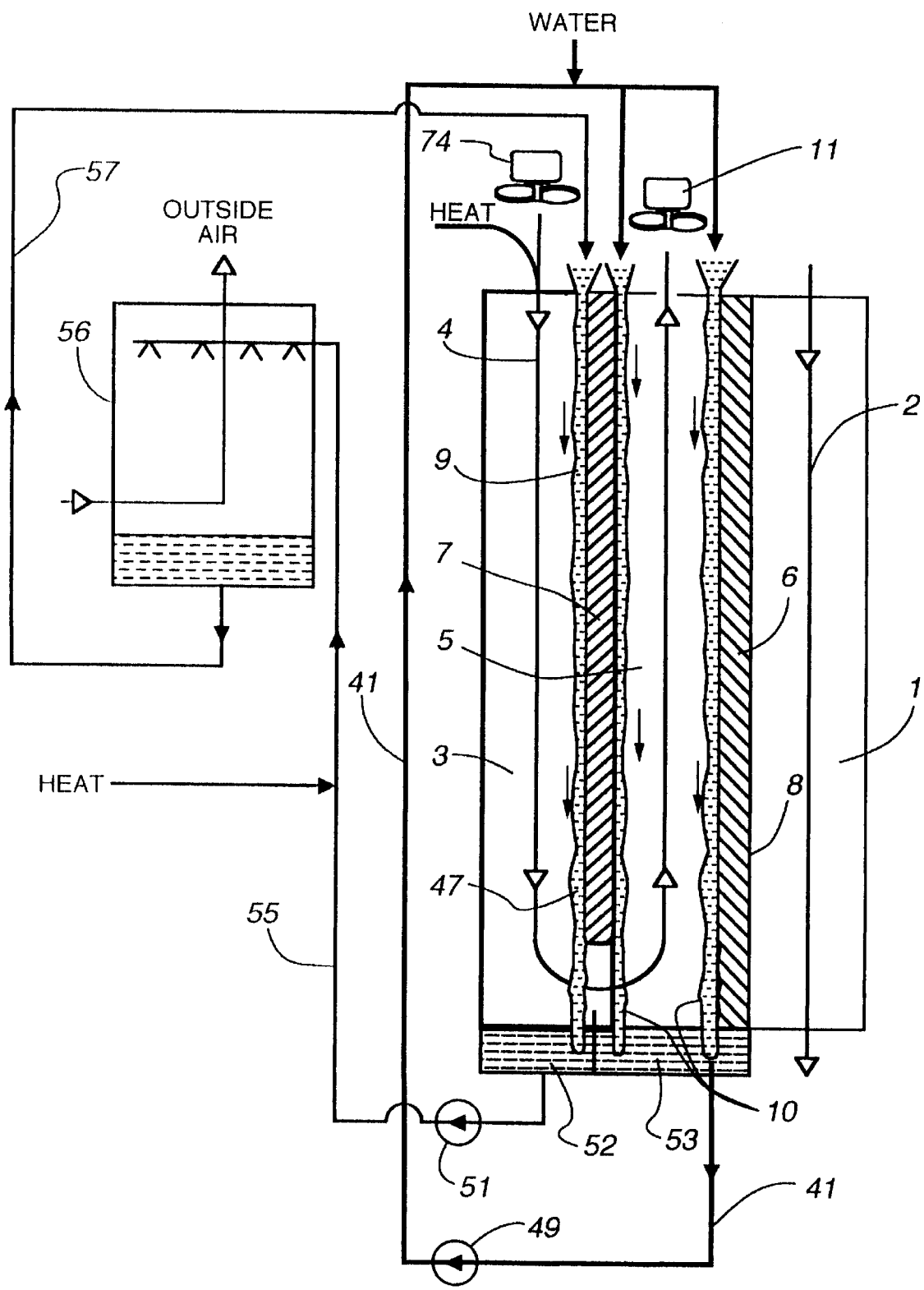
FIG. 3 is a flow diagram where a desiccant, 47, is used in the Dry Channel 3 for drying the air and a separate regeneration apparatus, 56, is used to increase the concentration of the desiccant. The Wet Channel 5 has water flowing down it and is cooled through evaporation. Product Channel 1 is set along side and in heat transfer contact with the Wet Channel 5 for Product cooling of some other fluid.
Figure 4:
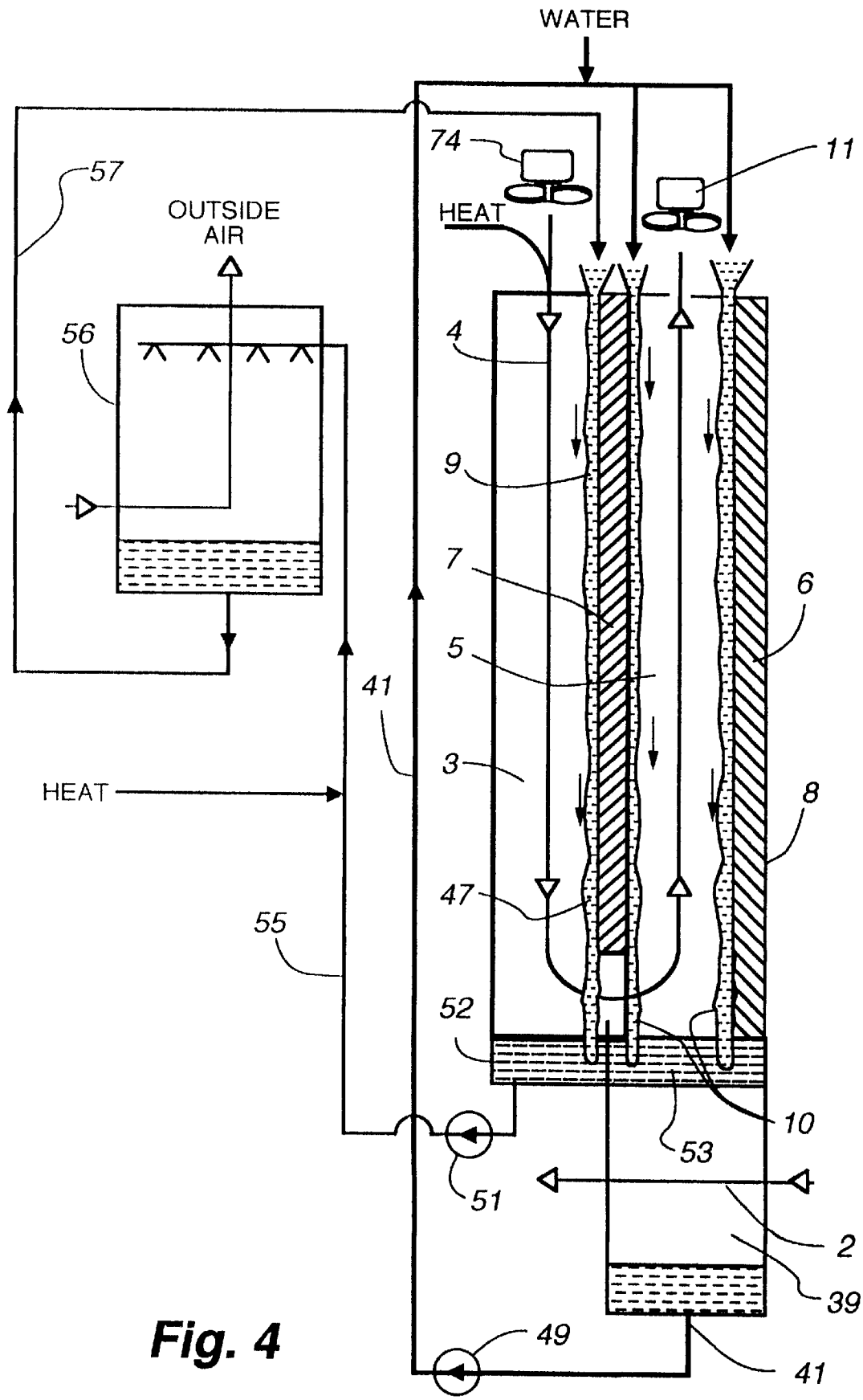
FIG. 4 is a flow diagram like FIG. 3 where a desiccant, 47, is used in the Dry Channel 3 for drying the air and a separate regeneration apparatus, 56, is used to increase the concentration of the desiccant 47. The Wet Channel 5 has water flowing down it 10 and is cooled through evaporation. Cool water 10 can be the Product 2.

FIGS. 3 and 4 add a concentrated desiccant in the Dry Channel 3 with a desiccant regeneration process out side the apparatus. This has the direct effect of lowering the humidity in the air allowing for lower temperatures and added cooling capacity. The desiccant 47 on surface 9 in Dry Channel 3 absorbs water vapor from the Working Air 4 and transmits heat through the wall 7 to the water 10 of the wet channel 5 evaporating into the Working Air 4. The continual cooling of the desiccant 47 in channel 3 increases the Working Air 4 drying capabilities.

The flow rate ratio with the working gas is described in Lowenstein, 5,351,497 and is ideal at 1.0 gpm/ft² in a counter flow design.

In higher humidity climates it is rational, FIG. 4, to establish the process, wherein liquid desiccant 47 flows down along the heat exchange surface 9 of Dry Channel 3, and water 10 also flows down along the walls 6 and 7 of the Wet Channel 5 simultaneously. In addition, liquid desiccant 47, after its passing along Dry Channel 3 and the tray 52, is directed by the pump 51 (via the pipe 55) to the regenerator 56, where moisture is vaporized from liquid desiccant and then it is brought back (via the pipe 57) into Dry Channel 3. Herewith, liquid desiccant, before it's directing to regenerator 56, beforehand is heated. And water 10, after it's passing along the Wet Channel 5 and the tray 53, is directed back by the pump 49 (via the pipe 41) to the Wet Channel 5.

When liquid simultaneously flows down in Dry Channel 3 and the Wet Channel 5 in the manner of moving fluid film 47 and Evaporative Liquid 10 (see FIGS. 3–5), it significantly improves heat and mass transfer performances in each channel. This creates a more compact and effective apparatus.

Figure 5:
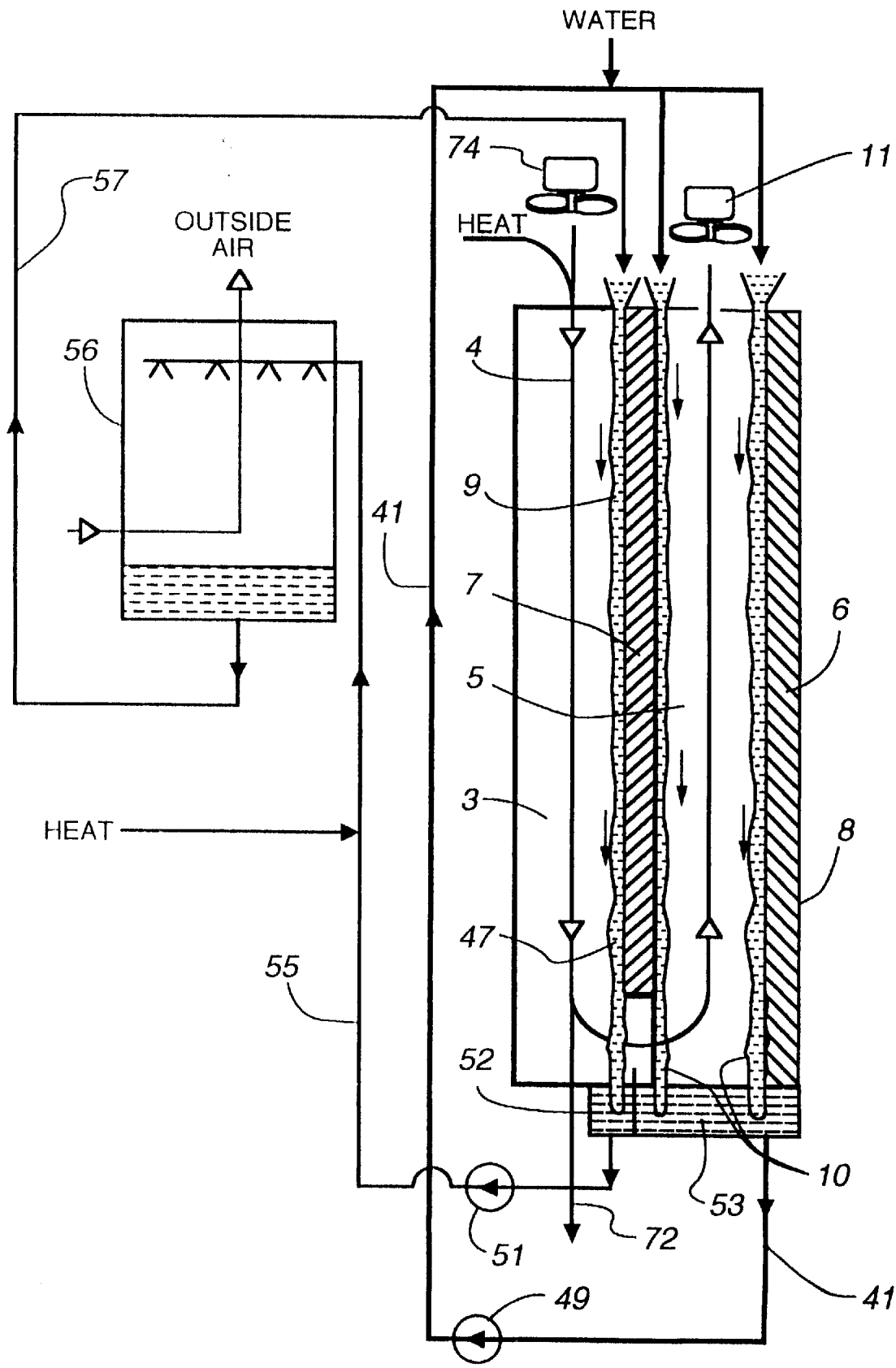
FIG. 5 is a flow diagram like FIG. 3 but where the Product 72 becomes part of the Working Fluid 4, which in most cases is air.

FIG. 5 illustrates the apparatus where a portion of the Working Air 4 is drawn off as the Product 72 and the rest of the Working Air 4 continues on in Wet Channel 5. This has the advantage of better heat transfer between the Product/Working Air than would there be in a Product Channel 1 or Product Heat Exchanger 39 when dry cold air is needed as a product.

Figure 6:
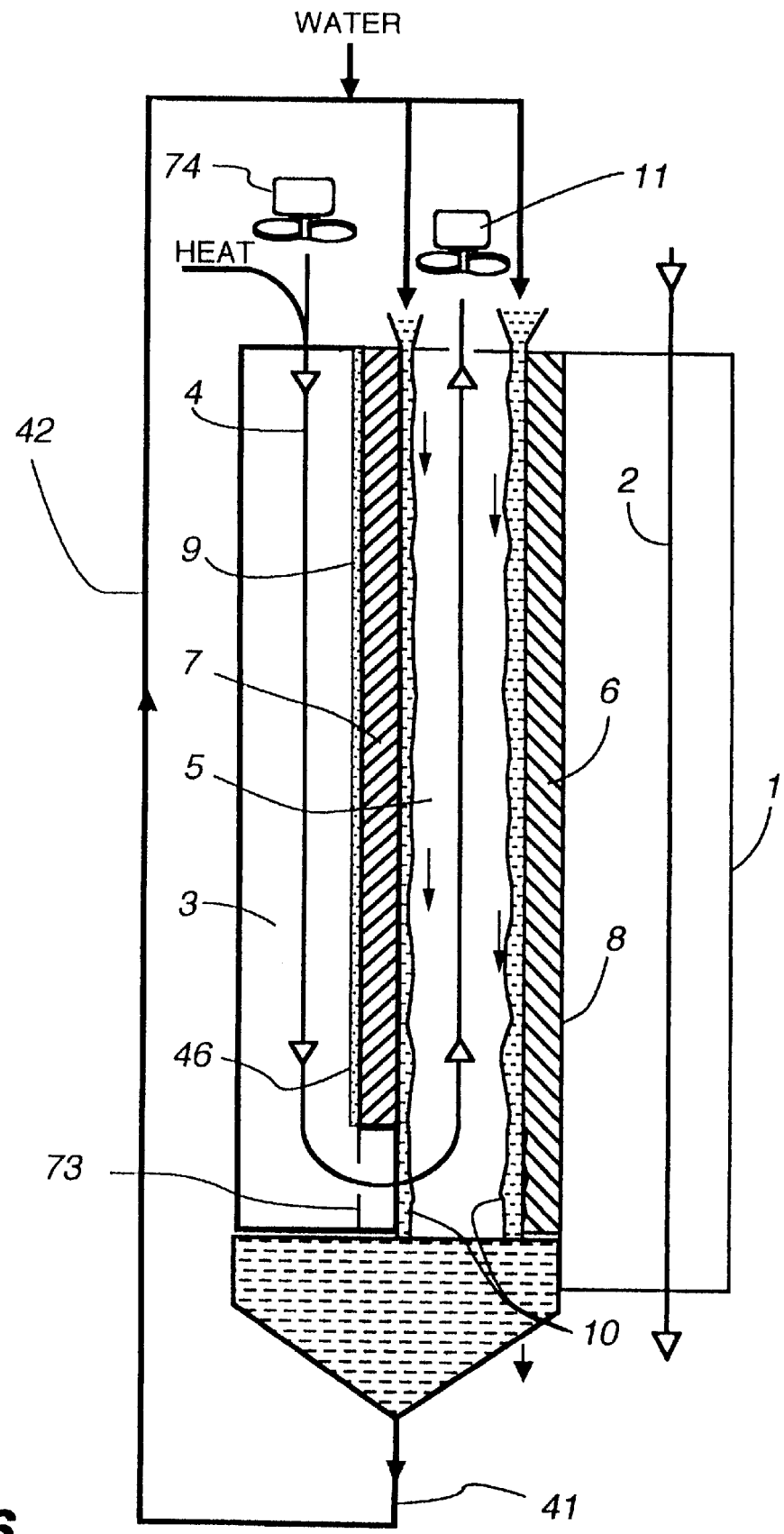
FIG. 6 is a flow diagram, where the heat exchange surface 9 of the Dry Channel is made of or covered with solid desiccant material 46, for example, silica gel, lithium chloride and etc. Regeneration of the desiccant is by passing water through the wall of the heat transfer surface.

FIG. 6 illustrates, an internal desiccant regeneration process in conjunction with a drying process wherein the heat exchange surface 9 of Dry Channel 3 is made or covered with any available solid desiccant material 46, for example, silica gel, lithium chloride and etc. When the Working Air 4 is passing through Dry Channel 3 in contact with a heat exchange surface 9, it reduces not only the temperature but also humidity of the Working Air 4, because solid desiccant material adsorbs the moisture from this air. The cold and drier Working Air 4 is passed to the Wet Channel 5 through pressure reduction baffle 73, if needed, where it evaporates the water 10 creating lower temperatures than outside air dew point temperatures because the Working Air 4 has less humidity. In addition the heat of adsorption, which transports from Dry Channel 3 via the wall 7 to the Wet Channel 5, is increased due to the direct contact of fluids through the wall 7. Herewith, this action increases heat and mass performances as in Dry Channel 3, as well as in the Wet Channel 5

In some cases it is necessary to create a larger Pressure drop between the Dry 3 and Wet 5 Channels to realize the process with the fluids being used as the Working Fluid 4, Evaporative Liquid 10 and drying liquid or solid 47. In this case a pressure reduction baffle 73 must be placed between the Dry and Wet Channel and possible a forced draft fan 74 at the inlet of Dry Channel 3.

In this method of indirect-evaporation cooling the walls 7 and 6 can be made of wick, plastic, metal or solid desiccant materials or compositions of these materials, with the physical capability of heat transfer being less along the surface of the wall or membrane as compared to the heat transfer rate across the thickness of the wall between the adjacent pathways. If the walls have some capacity of transferring vapor or liquid across the thickness, a bias will be created, by pressure or other means commonly known or developed in the future to bias this ability to be on a selected direction such as from the Dry Channel to the Wet Channel, or from the Product Channel to the Wet Channel. This method gives unique possibility to organize the very effective heat and mass exchange processes between the Dry 3 and Product 1 Channels and the Wet Channel 5, using the wick or solid desiccant materials for the walls 7 and 6, without presence of the waterproof partition. First of all, it improves heat and mass transfer performances in channels because wetted wick or solid desiccant materials have more conductivity than other materials, due to the moisture passage into the material on the Dry side and out of the material on the wet side. Also less heat resistance on the interface between airflow and the wall or the liquid film or moving liquid film and a wall. Second, wick or solid desiccant materials for the wall enables effective transport of adsorbed moisture from Dry Channel 3 to Wet Channel 5 via the membrane. The differences of the pressures between Dry Channel 3 and Wet Channel 5, aid this movement. Opposite direction of movement of liquid from the Wet Channel 5 to the Dry Channel 3 and 1 is not possible, because pressure in the Wet Channel 5 is always less than pressure in the Dry Channels 3 and 1.

Figure 7:
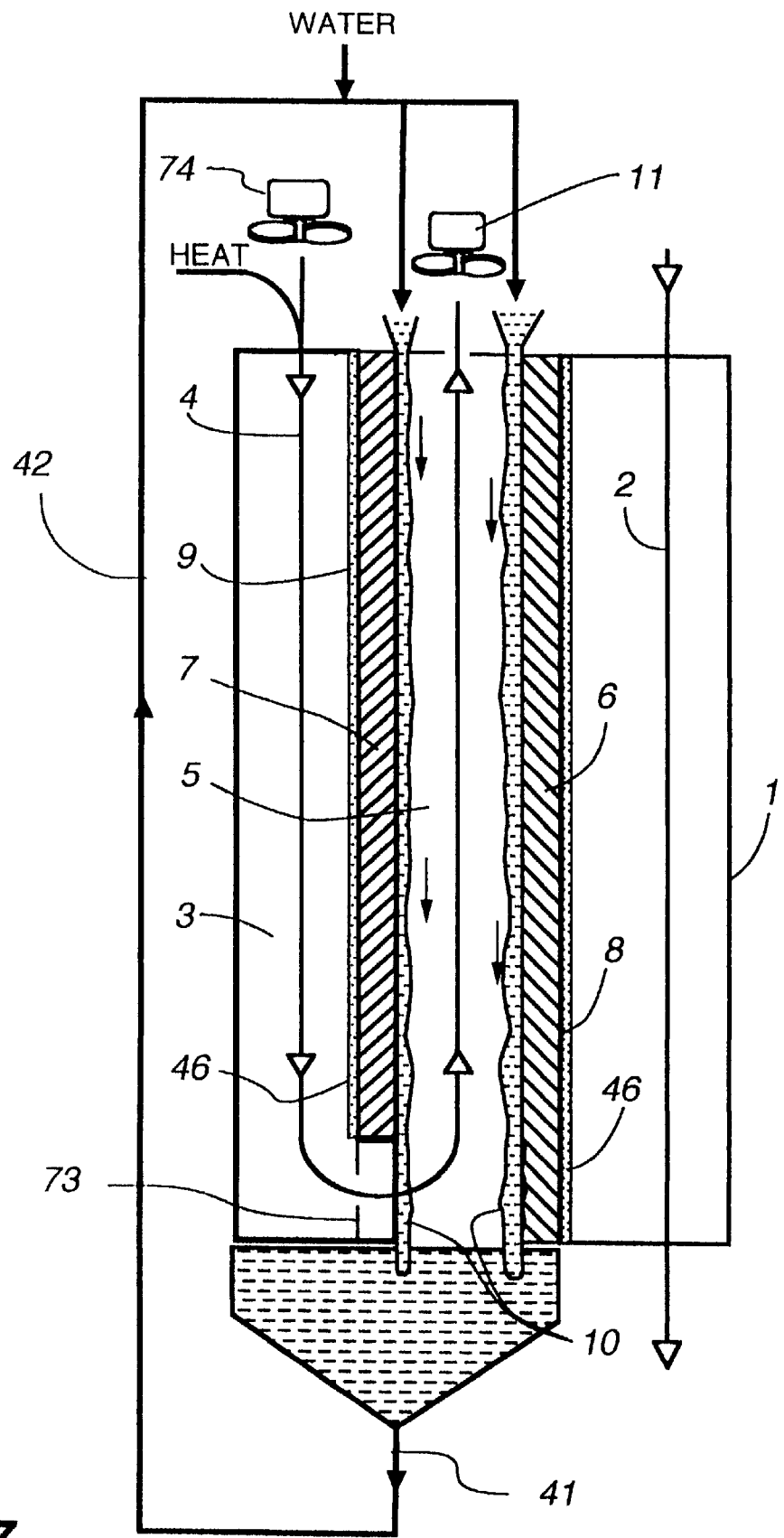
FIG. 7 is a flow diagram, where the heat exchange surfaces of the Dry Channel 3 and also the Product Channel 1 are made or covered with the solid desiccant material 46.

FIG. 7 shows the same scheme like FIG. 6, wherein there is only one distinction, namely, the heat exchange surface 8 of the Product Channel 1 also is made or covered with the solid desiccant material 46, for example, silica gel, lithium chloride and etc. When the Product Fluid 2, for example, outside air is passing through the Product Channel, solid desiccant 46 adsorbs the moisture from this air. This creates not only cold (about the dew point temperature of dried air 4) but dryer air 2. The process of adsorption in Dry Channels 1 and 3 is continuous. Adsorbed moisture transports from Dry Channels 1 and 3 via the walls 6 and 7 to the Wet Channel 5, because the pressure of air is always less in the Wet Channel 5 than in the Dry Channels 1 and 3. In addition the density difference between the desiccant 46 and the water 10, and the heat flux direction from desiccant 46 to water 10 will help pull the water from the desiccant to the Wet Channel 5.

Figure 8:
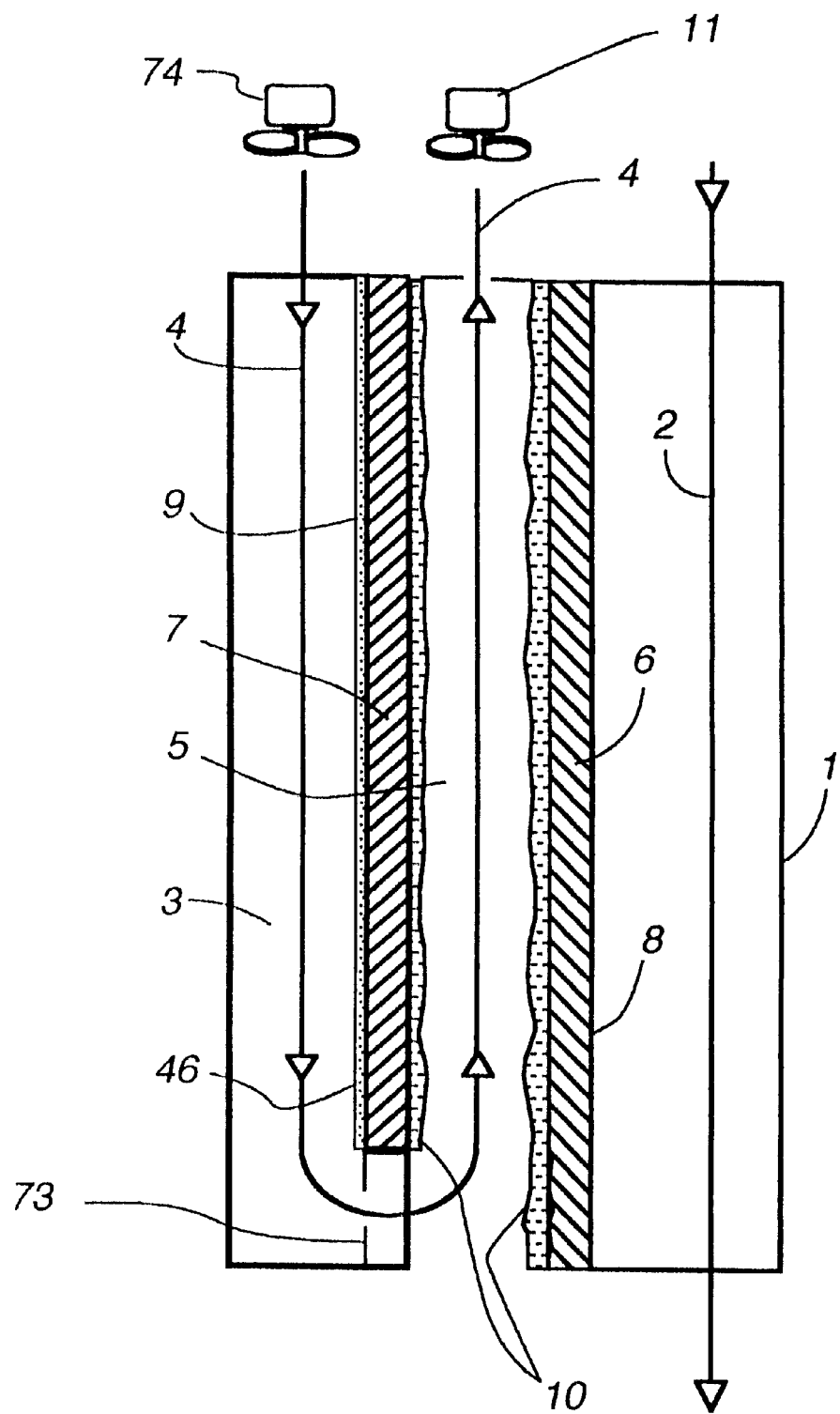
FIG. 8 and FIG. 9 are flow diagrams, where the Dry Channel 3 or both the Dry 3 and Product 1 Channels are made of or covered with solid desiccant material 46 and the walls of the Wet Channel 5 are wetted by a Evaporative Liquid 10 such as water without the formation of a moving liquid film.
Figure 9:
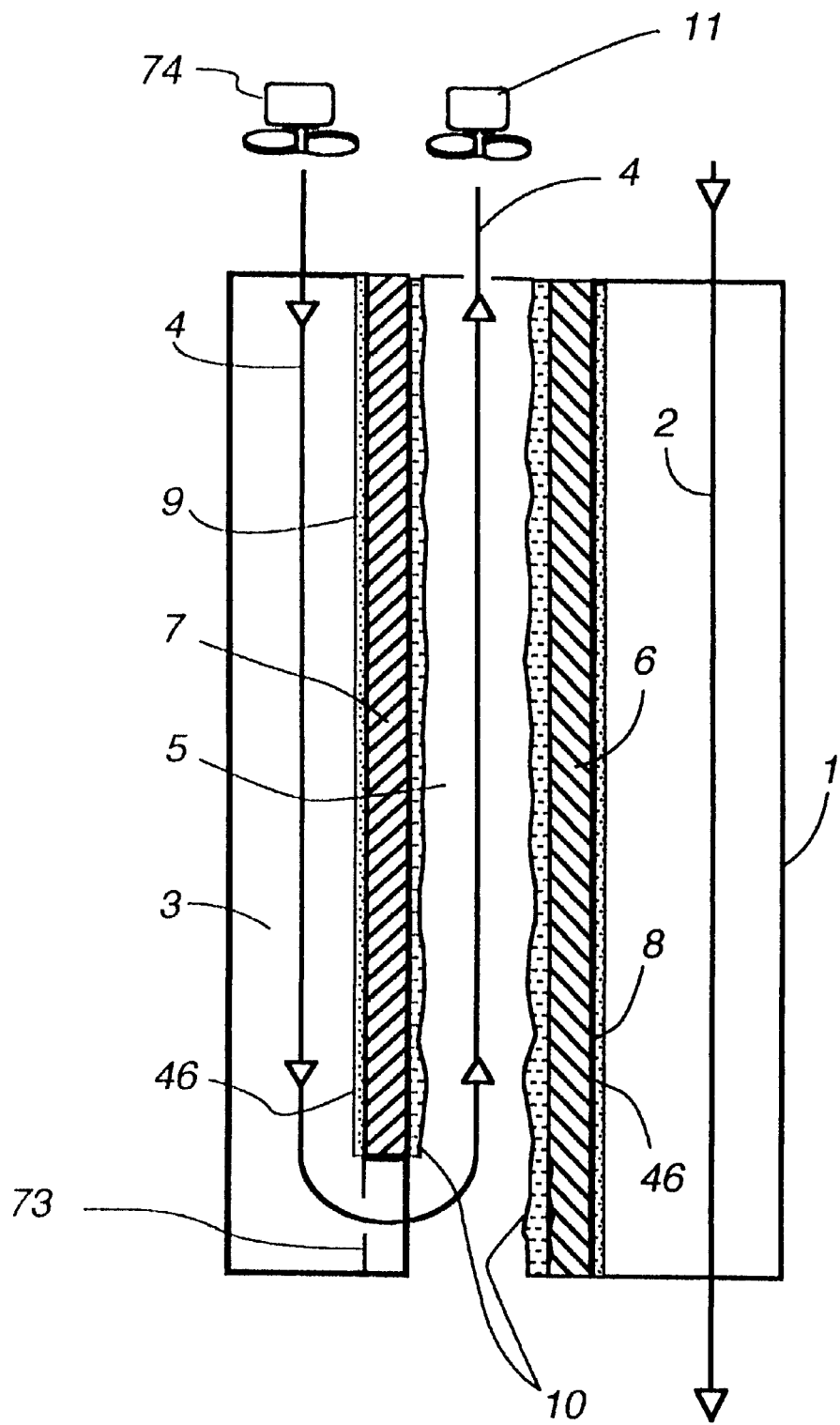

FIG. 8 and FIG. 9 illustrate the flow diagrams of the present method; wherein the walls 7 and 6 of the Wet Channel 5 are wetted by water 10 without the formation of a moving liquid film with for instance the use of a wick. Herewith, the heat exchange surface 9 of Dry Channel 3 (FIG. 8) or the heat exchange surfaces 9 and 8 of both Dry 3 and Product 1 Channels (FIG. 9) are made or covered with the solid desiccant material 46, for example, silica gel, lithium chloride and etc. In this case the Product Fluid 2, for example, outside air can be cooled lower then the dew point temperature of the outside air. The advantage of not having a moving water film 10 is that there is no energy losses do to cooling water that is not directly evaporated allowing for additional product cooling.

Figure 9A:
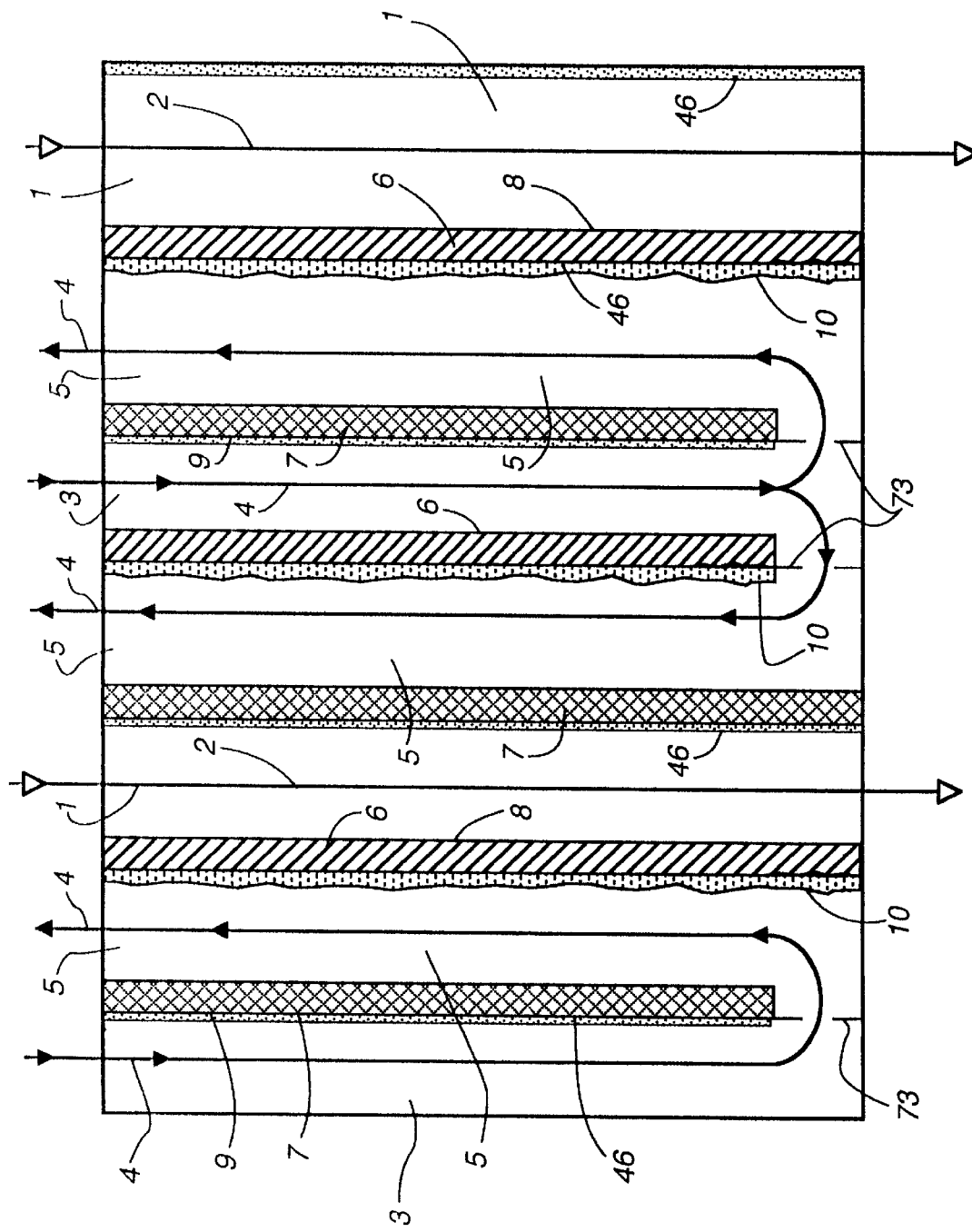
FIG. 9(a) is similar to FIG. 9, except it has the working membrane made of or covered with solid desiccant.

FIG. 9a is similar to FIG. 9 illustrating the flow diagram of the present method wherein the sides of the walls 7, which are located in the Dry Channels 3 and/or the Product Channels 1 are made or covered with a solid desiccant material 46, such as silica gel, lithium chloride, etc. The use of a solid desiccant sheet or membrane is disclosed in U.S. Pat. No. 5,653,115. Similar materials are available from manufacturers. The other side of these walls 7 are located in the Wet Channel 5, but are not wetted by the Evaporative Liquid. Only Wet Channel 5 side of walls 6 are wetted with Evaporative Liquid 10 such as water, liquid desiccant or fuel. The advantage of this design is that it adsorbs water vapor from the Working Air 4 in the Dry Channels 3 and/or the Product Air 2 in the Product Channels 1 via the walls 7 and 6 to the Wet Channels 5.

The present method can be efficiently used also for air conditioning and cooling systems for vehicles, wherein the Evaporative Liquid in the Wet Channel 5 is liquid fuel (see FIGS. 10–13).

Figure 10:
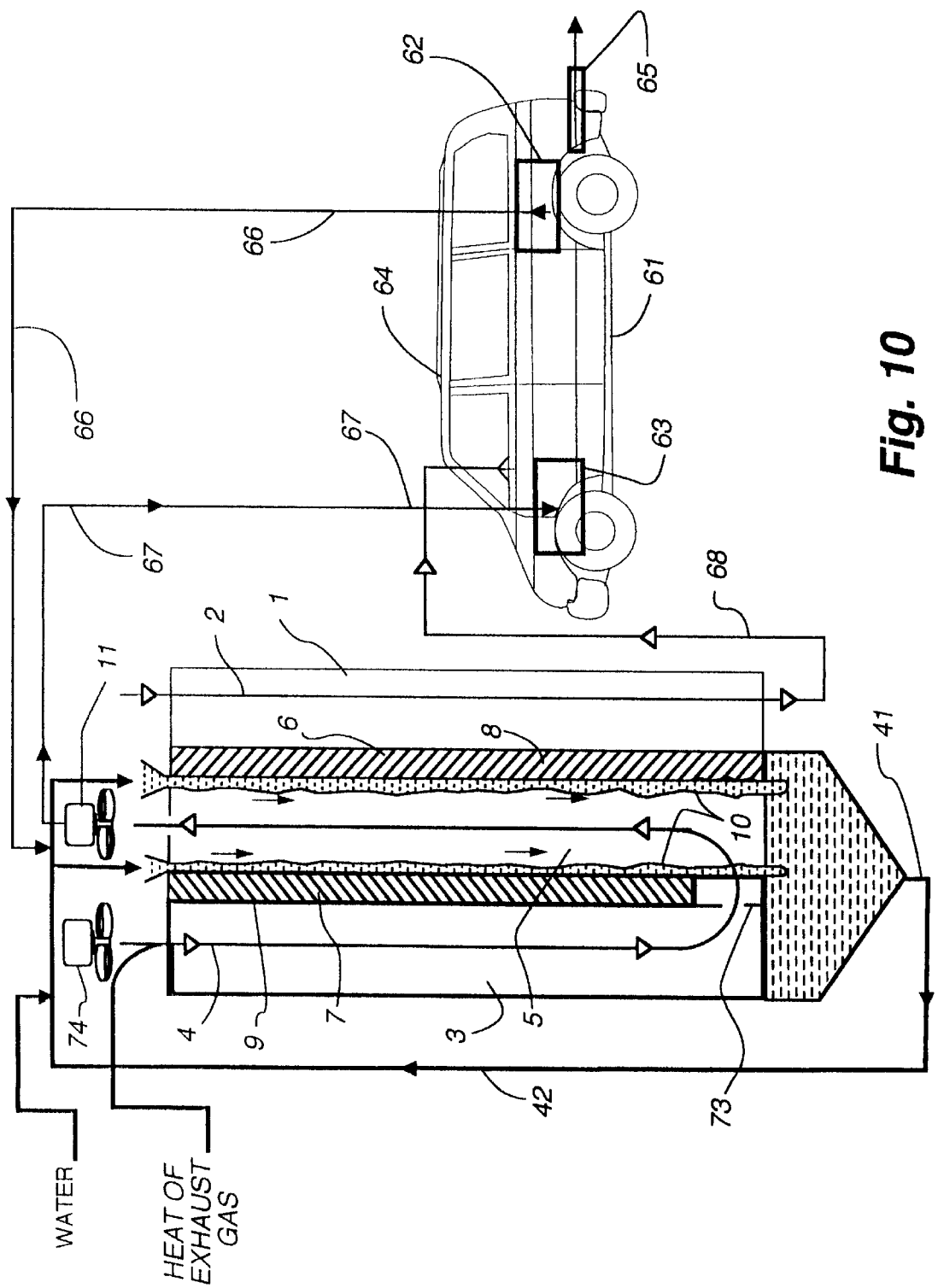
FIG. 10 is a flow diagram, where liquid fuel 10 flows down along the walls of the Wet Channel 5: vehicle-61, fuel tank-62, internal combustion engine-63, vehicle cab-64, exhaust gas-65, pipe-66, ducts-67 and 68.

FIG. 10 illustrates the same apparatus as in FIG. 1, wherein Evaporative Liquid 10 is a fuel, which is drawn from the fuel tank 62 of a vehicle 61 and it is transported via a pipe 66 to the Wet Channel 5. Herein, liquid fuel 10 flows down along the walls 7 and 6 of the Wet Channel 5. At the same time, the Working Air 4, for example, outside air is directed along Dry Channel 3 in contact with a heat exchange surface 9. In so doing, the Working Air 4 is cooled without change in its moisture content and then it is turned to the Wet Channel 5, where it moves counter currently in contact with the moving film 10 of liquid fuel. In the Wet Channel 5 the vapor evaporates from liquid fuel 10 into the Working Air 4. As a result this contact, latent heat of evaporation is removed. As the Working Air 4 passes along the Wet Channel 5, it is heated through the heat exchange wall 7, and saturated by the vapor of liquid fuel and an induced draft fan 11 pulls it through channel 5. Forced draft fan 74 is an optional but less desirable arrangement needed to accommodate actual apparatus physical design restraints. Hereon, this fuel-air mixture is directed via duct 67 to the internal combustion engine 63 of a vehicle 61. At the same time the Product Fluid 2, for example, outside air is directed along the Dry Channel 1 in contact with the heat exchange surface 8. Herein, outside air 2 is cooled ideally to the temperature reached of the fuel/air mixture temperature created when the fuel evaporates in air, that the engine 63 requires.

After passing along the Dry Channel 1, the Product Fluid 2 is directed via the duct 68 to the cab 64 of a vehicle 61. The heat exchange surfaces 9 and/or 8 of Dry Channel 3 and/or the Product Channel 1 can be made or covered by a solid desiccant material, for example, silica gel, lithium chloride and etc. (as this is seen from FIGS. 7–9). In additional, the walls 6 and 7 of the Wet Channel 5 can be wetted by liquid fuel 10 without formation of a liquid moving film (as this is seen from FIGS. 8 and 9).

Figure 11:
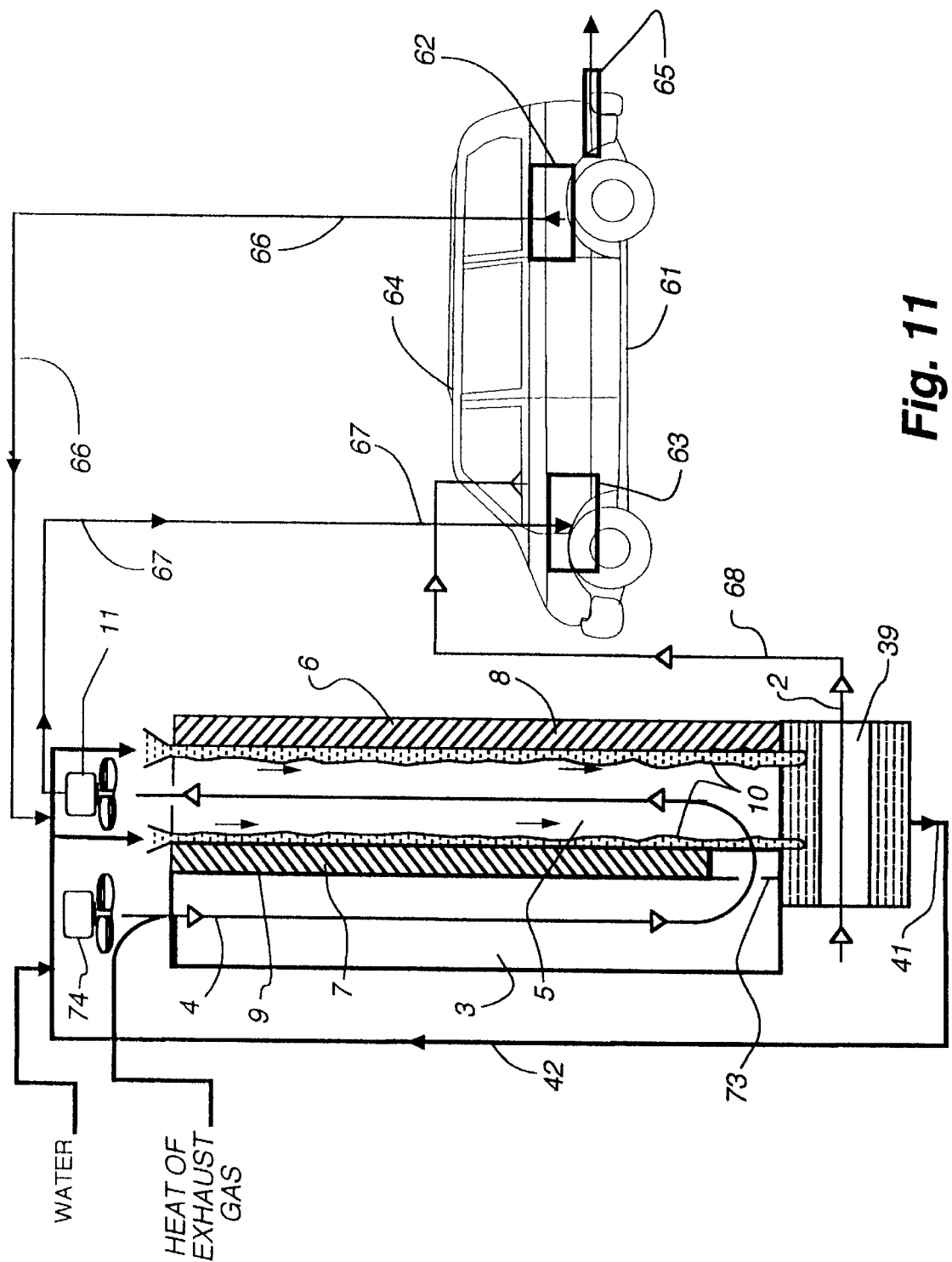
FIG. 11 is the same flow diagram like FIG. 10, where the Product 2, such as air, being cooled is in a heat exchanger 39 using the Evaporative Liquid 10 after it's cooled.

FIG. 11 is the same flow diagram like FIG. 10, where the Product Fluid 2, for example, outside air is directed to heat exchange apparatus 39 for heat exchange contact with cold liquid fuel 10, after its passing through the Wet Channel 5. Hereon, the cold air 2 is directed via the duct 68 to the cab 64 of a vehicle 61. In additional, the Working Air 4 as the fuel-air mixture, after it's passing along the Wet Channel 5, is directed via the duct 67 to the internal combustion engine 63 of a vehicle 61.

Figure 13:
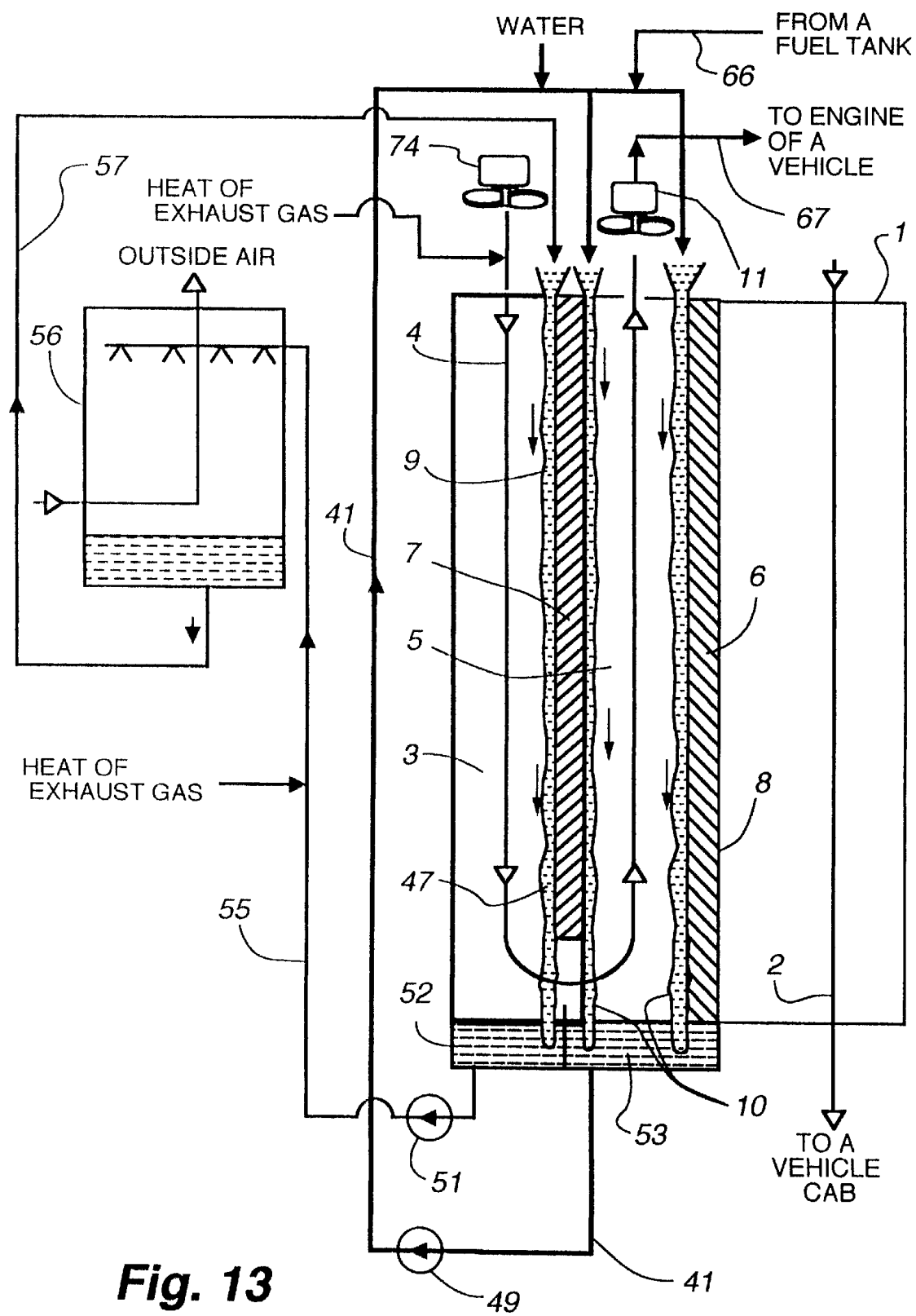
FIG. 13 is the same flow diagram like FIG. 12, where the Product 2, such as air, being cooled is in the Product Channel 1.

FIG. 13 illustrates the same scheme like in FIG. 10, but wherein as the Evaporative Liquid is a mixture of water and fuel 10, which is selected from the fuel tank 62 of a vehicle 61, and it is transported via a pipe 66 to the Wet Channel 5. Herein, water and liquid fuel 10 flows down along the walls 6 and 7 of the Wet Channel 5 or they are wetted by liquid fuel 10 without formation of a liquid moving film. Simultaneity liquid desiccant 47 flows down along the heat exchange surface 9 of Dry Channel 3 and then it is directed to the regenerator 56. Herein, moisture is vaporized from liquid desiccant 47 by heat of exhaust gas 65 of a vehicle 61, and it is brought back into Dry Channel 3. This drying of the Working Air 4 prior to passing through the Wet Channel 5 increases the product cooling quantity and quality as it allows additional evaporation of water as well as fuel. Working Air 4 passes along the Wet Channel 5 creating the fuel-air mixture and is directed via the duct 67 to the internal combustion engine 63 of a vehicle 61. Simultaneously the Product Fluid 2, for example, outside air, after it's passing along the Dry Channel 1 is directed to the cab 64 of a vehicle 61.

Figure 12:
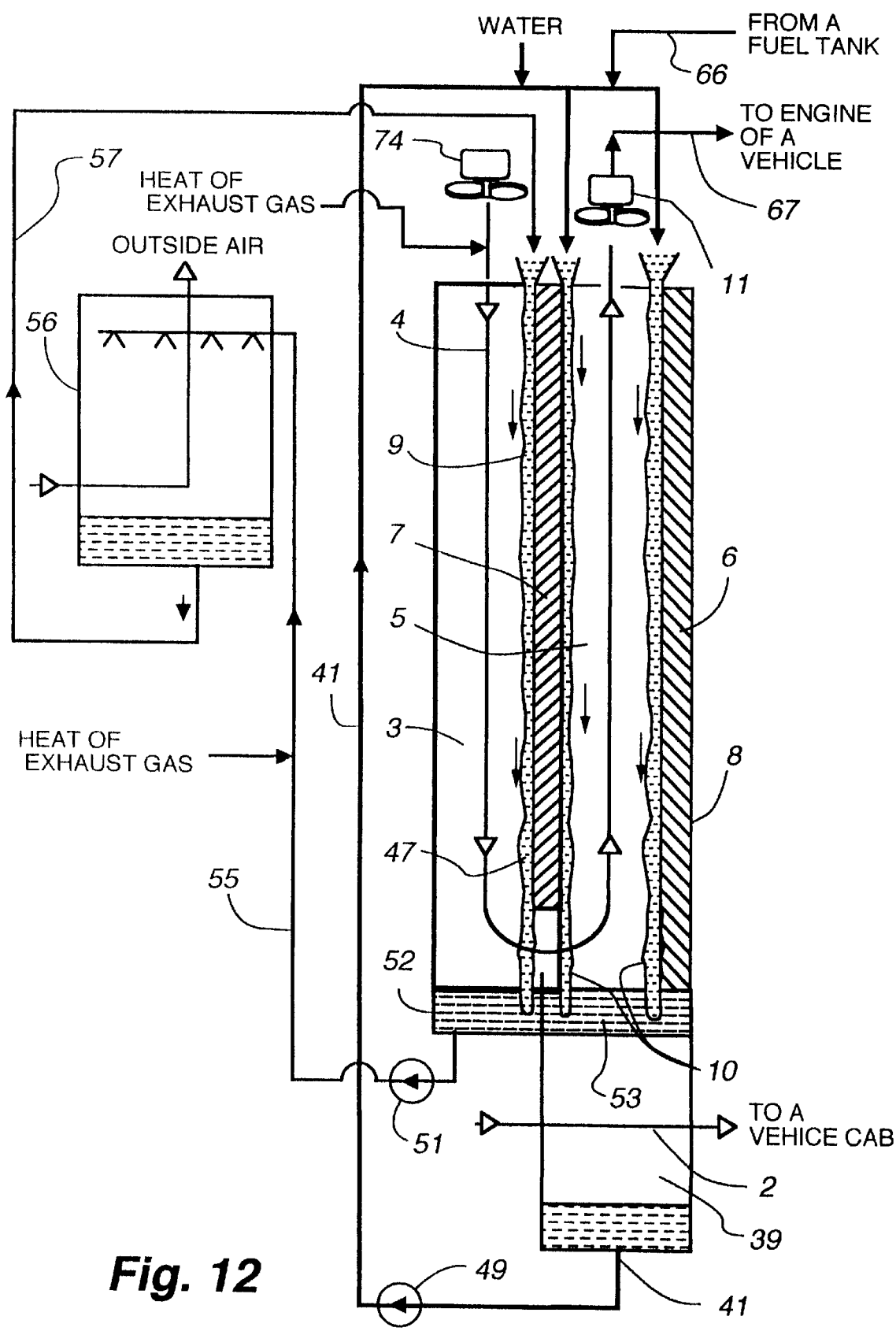
FIG. 12 is a flow diagram, where liquid desiccant 47 flows down along the heat exchange surface 9 of the Dry Channel 3 and simultaneously liquid fuel 10 flows down along the walls of the Wet Channel 5 and the product is cooled in the Product Heat Exchanger 39.

FIG. 12 is the same flow diagram like FIG. 13, where the Product Fluid 2, for example, outside air is directed to the heat exchange apparatus 39 for heat exchange contact with cold water and/or liquid fuel 10, after its passing through the Wet Channel 5. Hereon, the cold product air 2 is directed via the duct 68 to the cab 64 of a vehicle 61. In additional, the Working Air 4 as the fuel-air mixture, after it's passing along the Wet Channel 5, is directed via the duct 67 to the internal combustion engine 63 of a vehicle 61.

In FIGS. 10–13 water can be added along with liquid fuel, and for certain in FIGS. 12 and 13 before it's passing along the Wet Channel 5 increases the evaporative cooling by a combined water and liquid fuel 10 in the Wet Channel 5. In addition it increases the water vapor in the fuel-air mixture, which is directed via the duct 67 to the engine 63, and it helps to improve the combustion process in the engine 63 of a vehicle 61. As a result the exhaust gases from the engine have less toxicity.

In vehicles that do not use enough fuel to adequately cool the interior, in electrical vehicles or other types of vehicles, water can be evaporated 10 in Wet Channel 5 of FIGS. 12 and 13. This system will need to be combined with a desiccant 46 in the Dry Channel 3, (FIG. 9) or another variation of the apparatus that dries the air.

Using the exhaust from the engine to preheat the air 4 entering channel 3 can effectively use waste heat to create a greater potential energy for cooler production.

Figure 14:
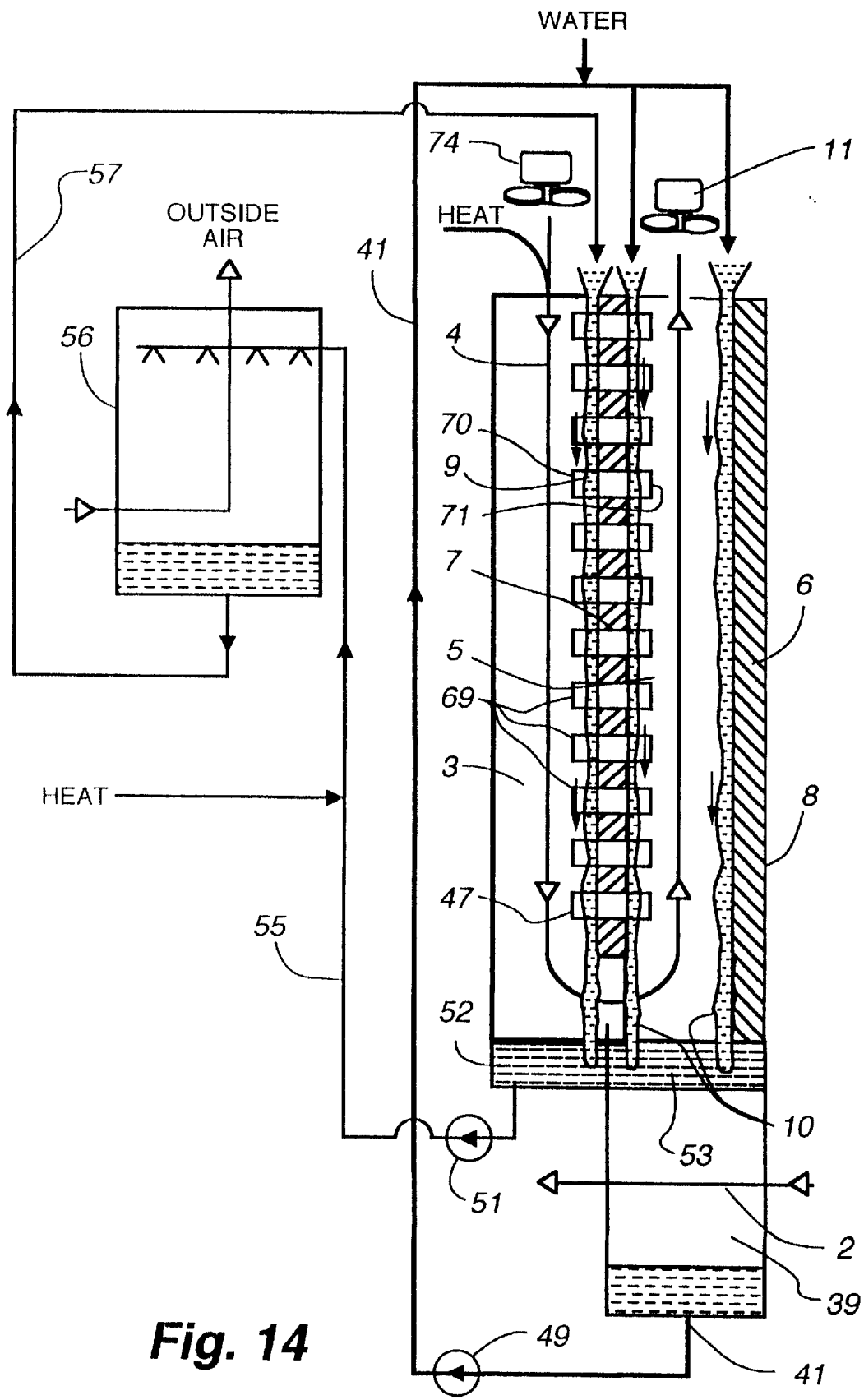
FIG. 14 is a flow diagram where the wall 7 is crossed with a bank of heat pipes 69, evaporator sections 70 that are located in the Dry Channels 3 and condenser sections 71 in the moist channel 5; the Product 2 cooling takes place in the Product Heat Exchanger 39.
Figure 15:
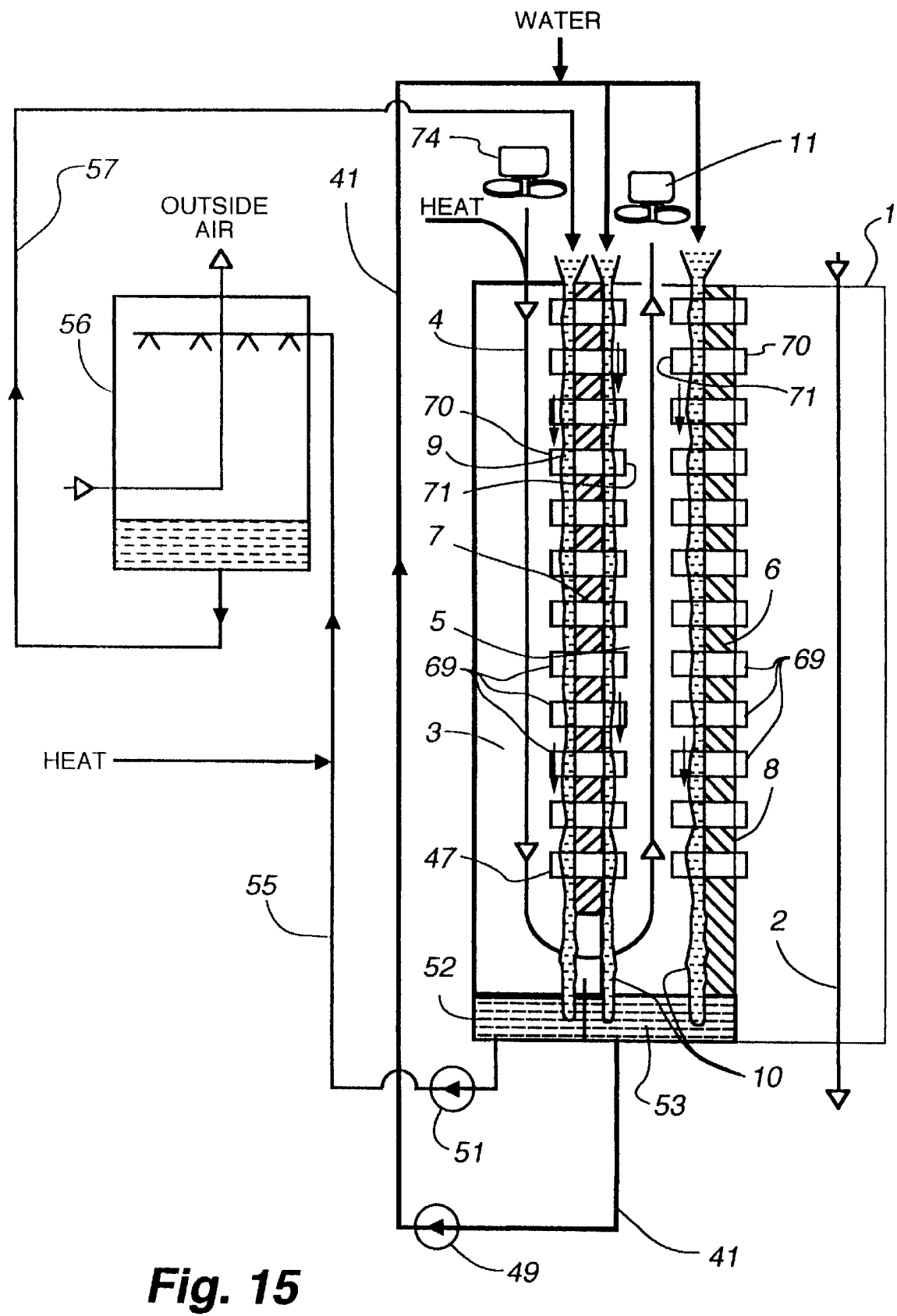
FIG. 15 is a flow diagram like FIG. 14 where a bank of heat pipes 69 is used to span between the Wet Channel 5 and the in the Product Channel 1.

Heat pipes can make an effective design within this method, see for example FIGS. 14 and 15 where the walls 6 and 7 separate the channels and a bank of heat pipes 69. Heat pipes such as those comprised of a sealed vessel with a heat carrier inside. On one end, heat is taken into the vessel by heat transfer boiling the heat carrier into vapor. The vapor moves to the cool section of the vessel where it condenses, giving up the latent heat and converting the vapor back to the liquid state. The evaporator section 70 being located in the Dry 3 or Product 1 Channels and condenser sections 71 are located in the Wet Channel 5. This effectively eliminates the need for a plethora of channels as the heat pipes transfer the heat. Additionally, the sections operate as surface irregularities to break up the boundary layers of the fluid. In conventional units heat pipes are used for thermal heat recovery units. In the present invention desiccant 47 is sprayed on the evaporator section (or evaporator section of the heat pipes are covered by a solid desiccant) of the heat pipes 70 of the bank of heat pipes 69 in the Dry Channel 3 with Working Air 4 flowing over the pipes and giving up the heat of absorption as the air is dried. This heat travels through the heat pipes to the Wet Channel 5 and the condensing side of the heat pipes 71, where water 10 is sprayed on them with the Working Air 4 traveling over the pipes and absorbing the water evaporation. The evaporation liquid desiccant 47 is used more efficiently because the heat of absorption is dynamically transferred away from the Dry Channel 3 to the Wet Channel 5, thus, reducing the absorption temperature and positioning the operation in a more favorable portion of the desiccant and moisture equilibrium map.

Figure 16:
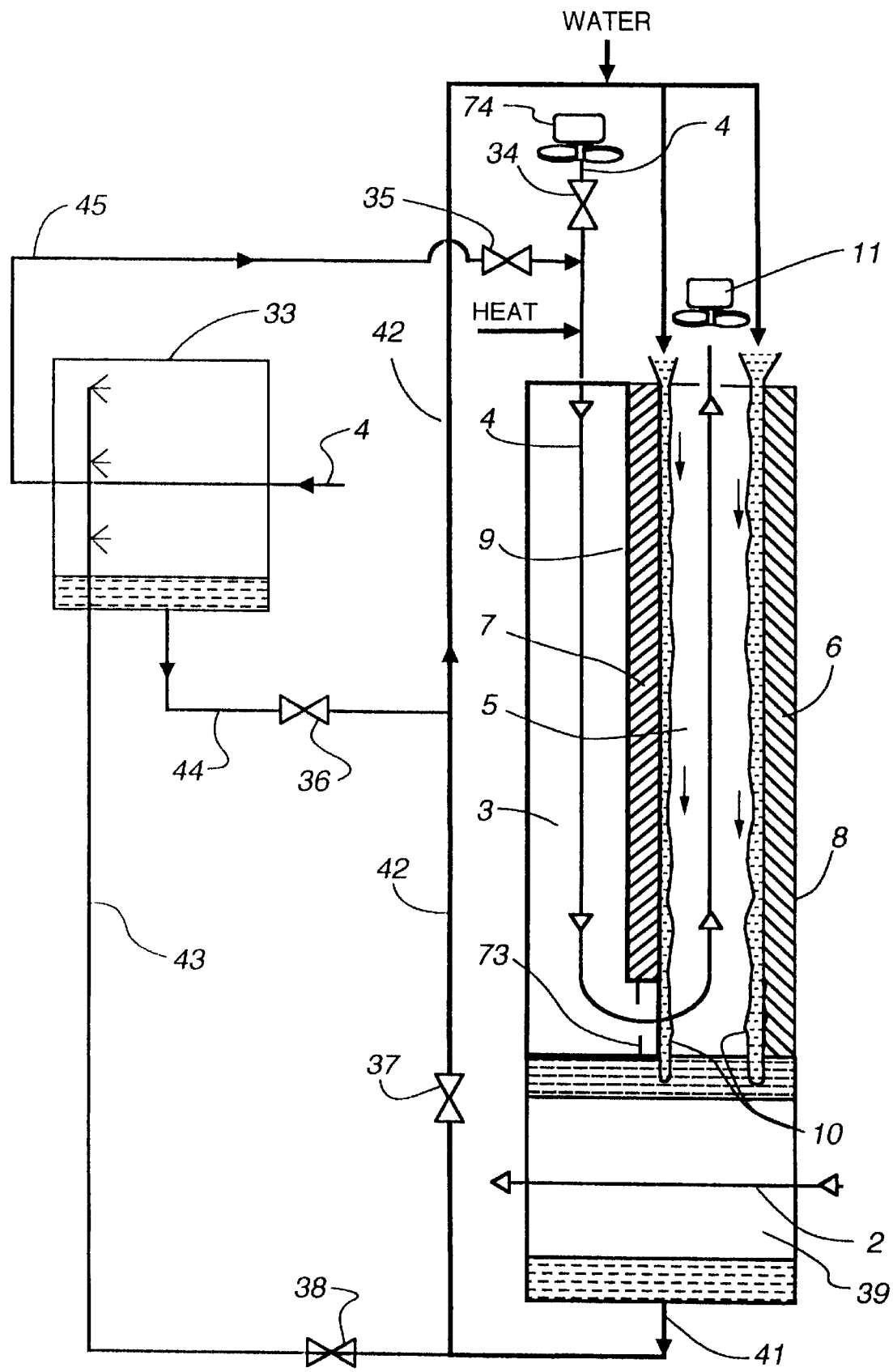
FIG. 16 is a flow diagram where cooled desiccant 10 is concentrated in the Wet Channels 5 and used for cooling. The concentrated desiccant is used for pre-drying the incoming air 4, and re-circulated in the Wet Channel 5.
Figure 17:
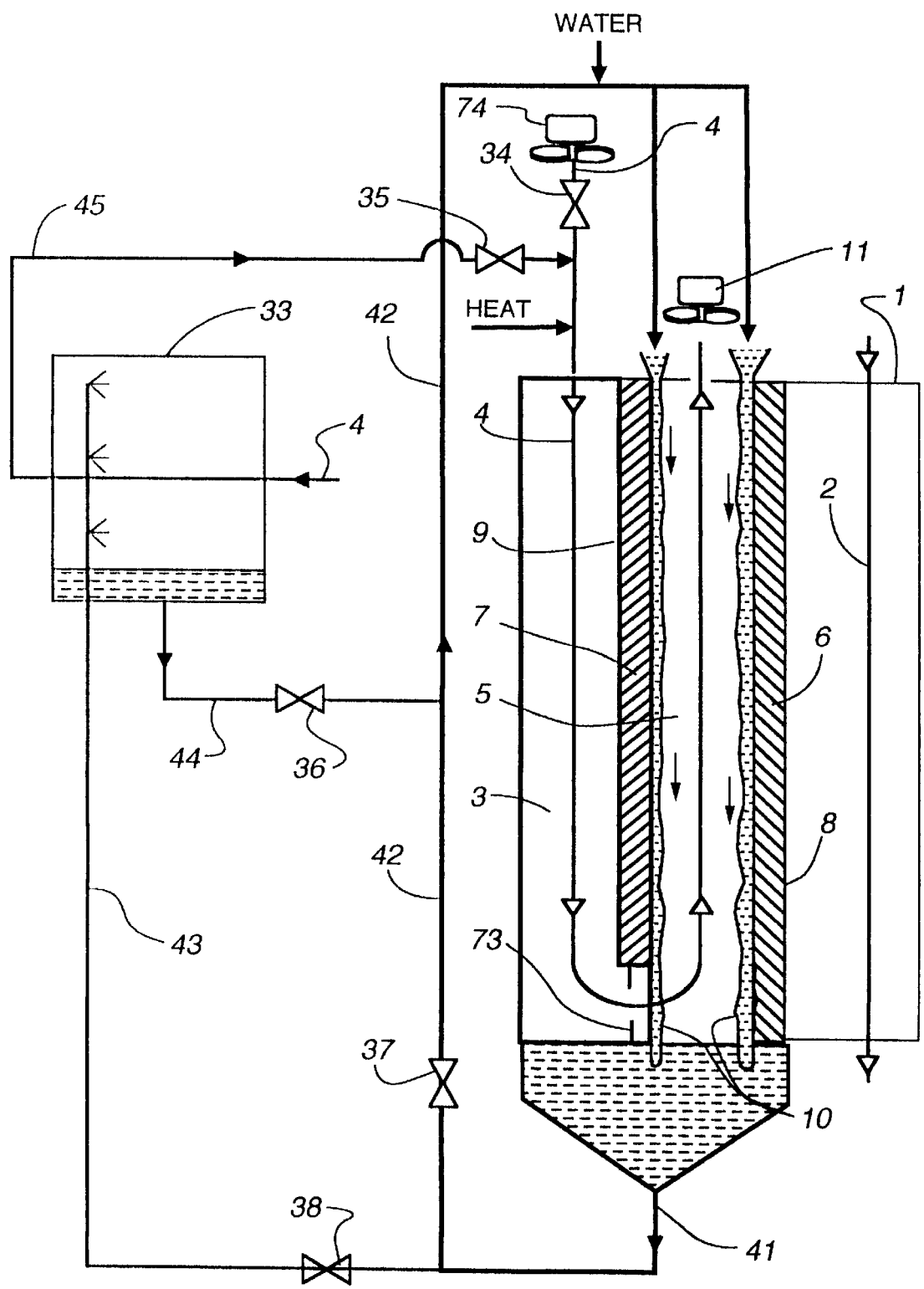
FIG. 17 is a flow diagram similar to FIG. 16 where a Product Channel 1 has been added.

FIGS. 16–19 illustrates a flow diagram of the present method of indirect-evaporation cooling where evaporative liquid 10 is a liquid desiccant which flows down the Wet Channel 5 of walls 6 and 7. The Working Air 4 is first directed for dehumidifying by contact with a concentrated liquid desiccant in a mass and heat exchange apparatus 33 or Air Dryer 33 (FIGS. 16 and 17).

In this case, the Evaporative Liquid 10 is the desiccant used in Air Dryer 33 and is being regenerated to a higher concentration for use in the Wet Channel 5. The concentrated desiccant is then directed via the pipes 41 and 43 (the valve 38 is opened and the valve 37 is closed) back to the mass and heat exchange apparatus 33. The hot but dry Working Air 4 coming out of Air Dryer 33 is transported via the duct 45 (the damper 35 is opened and the damper 34 is closed) to Dry Channel 3. The hot and weak desiccant 10 coming out of Air Dryer 33 is directed via the pipes 44 and 42 (the valve 36 is opened) to the inlet of the Wet Channel 5. The valves 36, 37 and 38 are dedicated for regulation of ratio of quantity of liquid desiccant 10 coming to the inlet of the Wet Channel 5 directly from of the outlet of the Wet Channel 5 (via the pipes 41 and 42) and from Air Dryer 33. The dampers 34 and 35 are dedicated for regulation of ratio of quantity of the Working Air 4 coming to the inlet of Dry Channel 3 from outside air (via the damper 34) and from the apparatus 33 (via the duct 45 and damper 35). This ratio depends from regimes of working all system and the parameters (especially humidity) of outside air because outside air is energy resource for realizing of this method of indirect-transpiration cooling.

To create the right conditions for the regeneration of desiccant in the Wet Channel 5, heat may need to be added to the Working Air 4. The specific heat input is readily known by one familiar with regeneration of desiccants. With added heat in the Working air there will be added potential energy for evaporation in the Wet Channel 5 allowing additional water to be added to the desiccant 10.

FIGS. 16–19 represent the apparatus being used to cool and regenerate or re-concentrate the desiccant.

FIG. 16 illustrates a flow diagram of the present method, where the Product Fluid 2, is directed for heat exchange contact with liquid 10, Product heat Exchanger 39. FIG. 17 uses a Product Channel 1 rather then a Product Heat Exchanger 39

Figure 18:
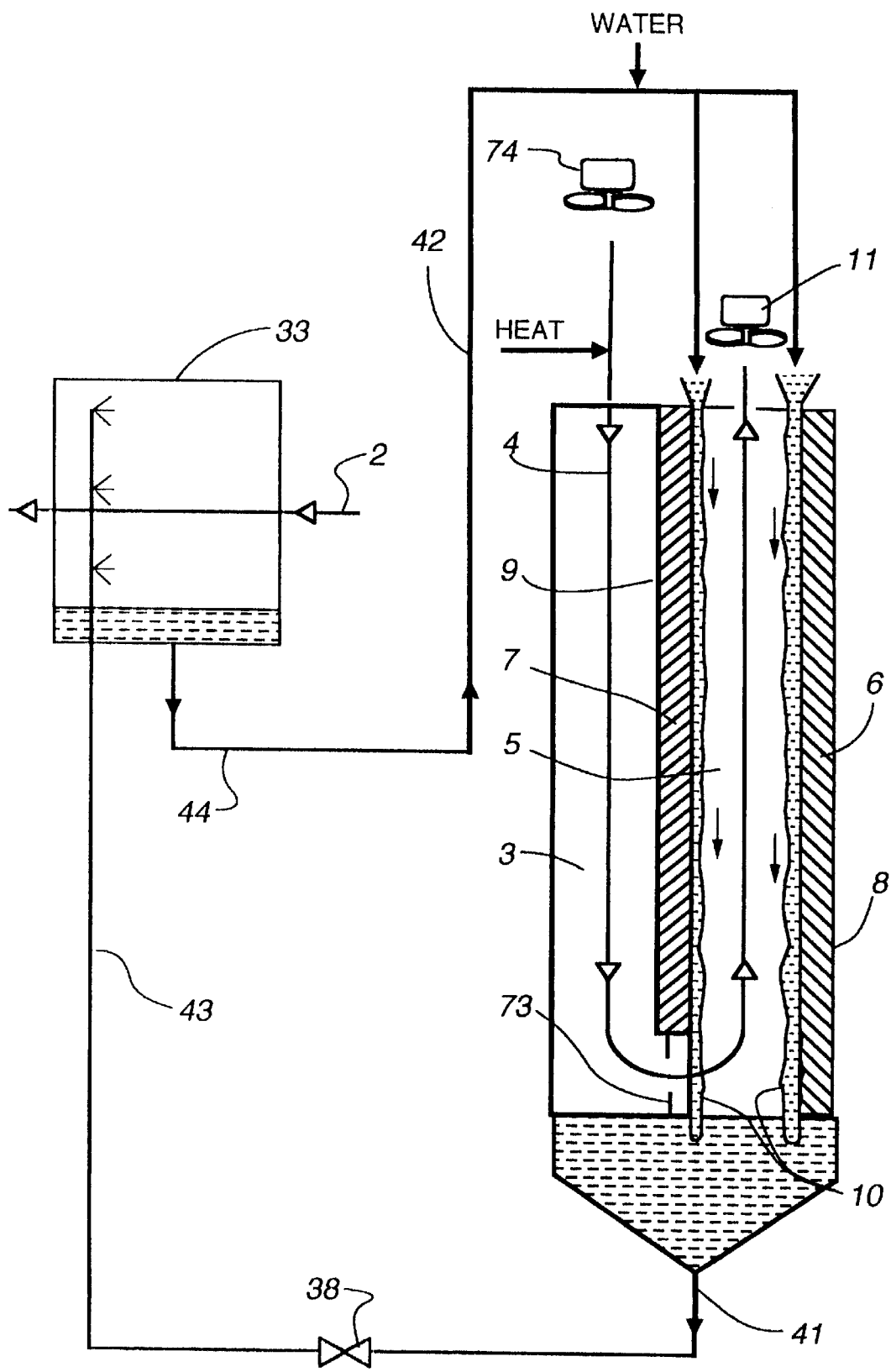
FIG. 18 is a flow diagram similar to FIG. 16 where cold desiccants is used to dry and cool air or Product 2.

FIG. 18 illustrates a flow diagram, where the desicant 10, (like on FIG. 16) but without the apparatus 39, is directed to Air Dryer 33. The Product Fluid 2 is passed through Air Dryer 33 where it is dried and cooled with cold desiccant. In this use the Wet Channel 5 becomes the desiccant regenerator and may require heat to be added to the Working Air 4 for the process to work and/or a large pressure difference between the Dry Channel 3 and the Wet Channel 5 caused by a pressure reduction baffle 73 a forced draft fan 74 and a induced draft fan 11.

Figure 19:
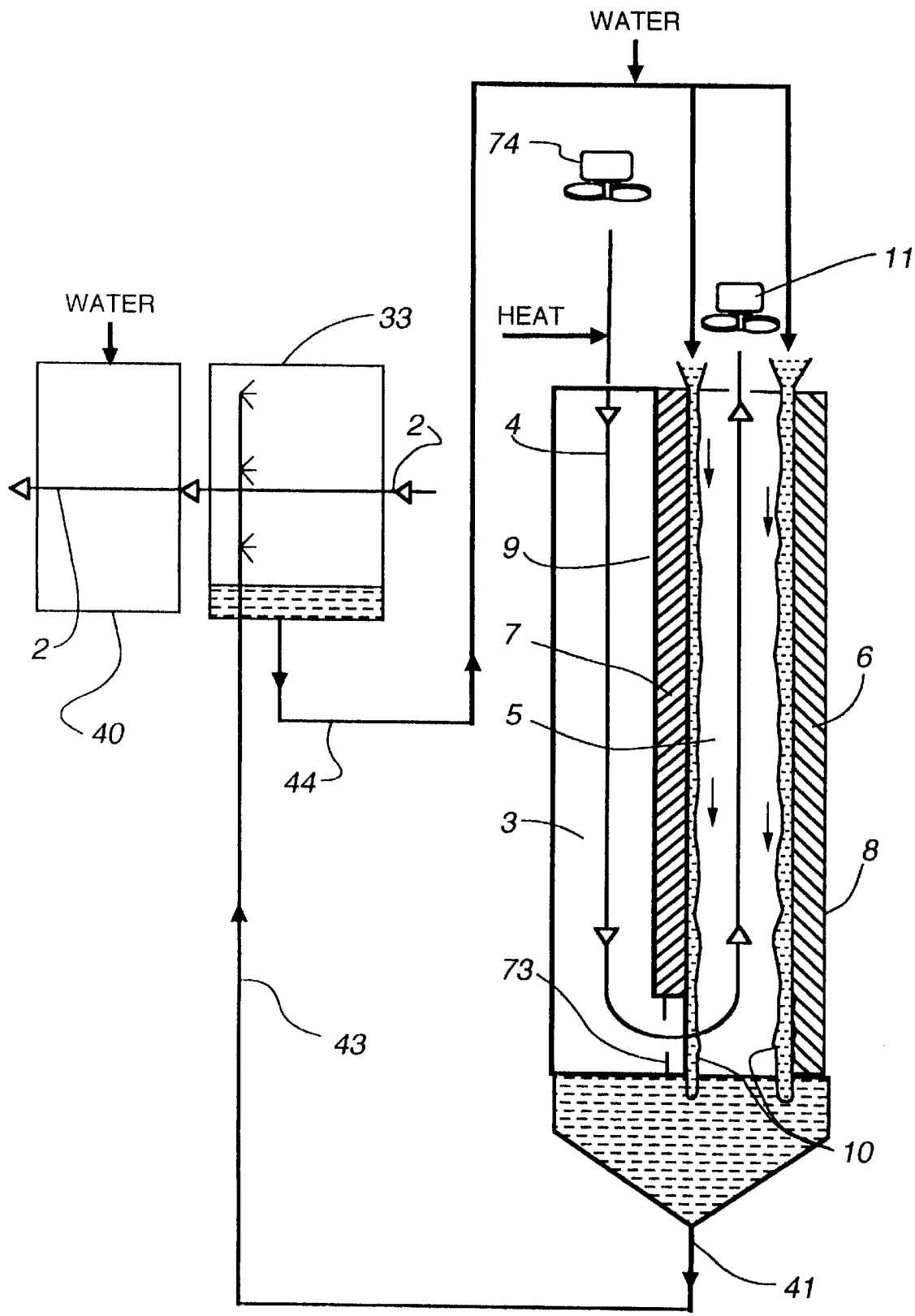
FIG. 19 is a flow diagram similar to FIG. 18 except dried air 2 is directed to an apparatus for direct or indirect cooling 40.

FIG. 19 illustrates a flow diagram of the present method, where the Product 2 is outside air after its mass and heat exchange contact with liquid desiccant 10 in apparatus 33, is transported to any kind of an apparatus 40 for direct or indirect evaporative cooling.

Figure 20:
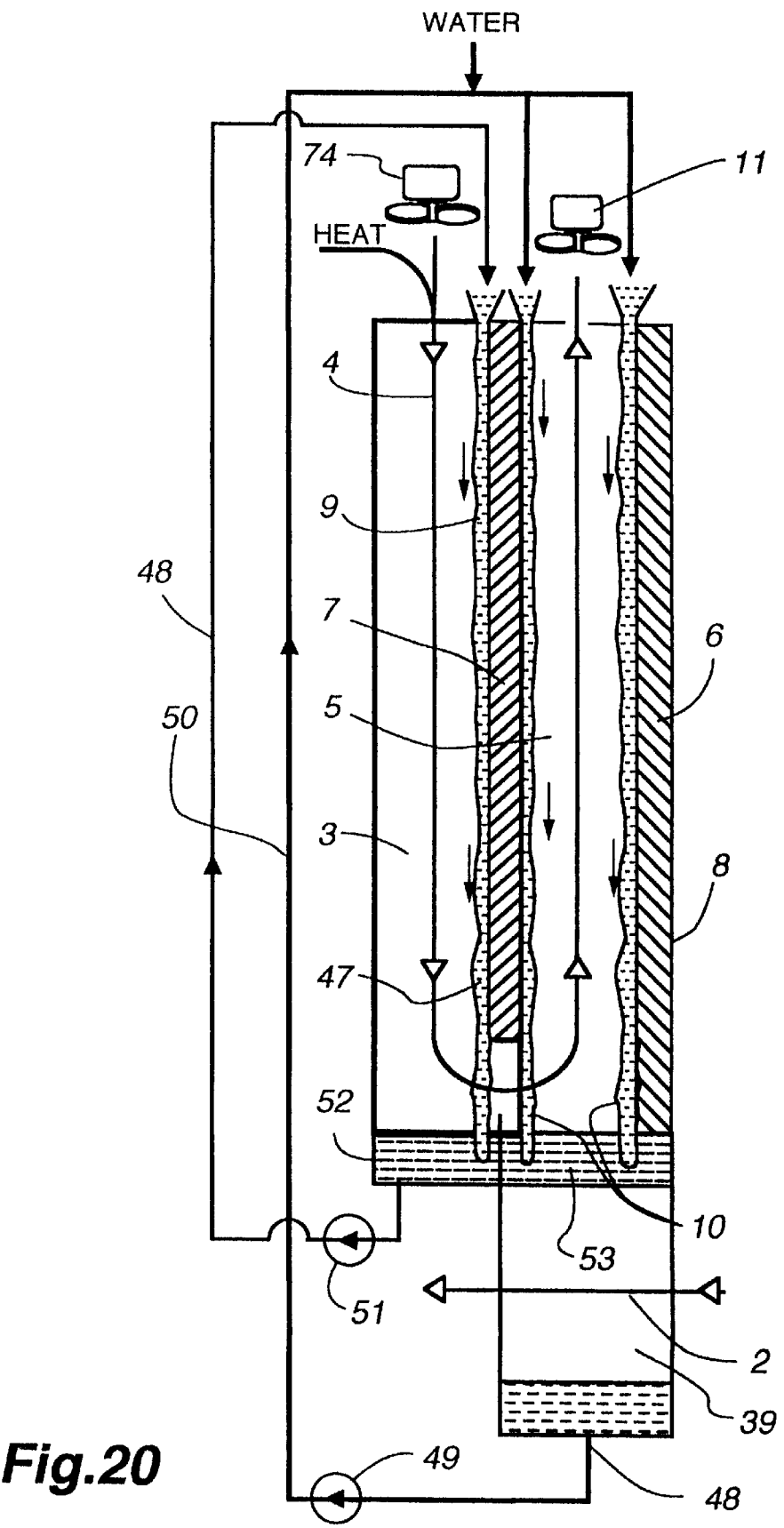
FIG. 20 is a flow diagram with the same general concept as FIG. 16 but where the desiccant dries the air in the Dry Channel 3 and then is directed to the Wet Channel, desiccant from the Wet Channel is returned to the Dry Channel. The Product 2 is cooled in the Product Heat Exchanger 39.
Figure 21:
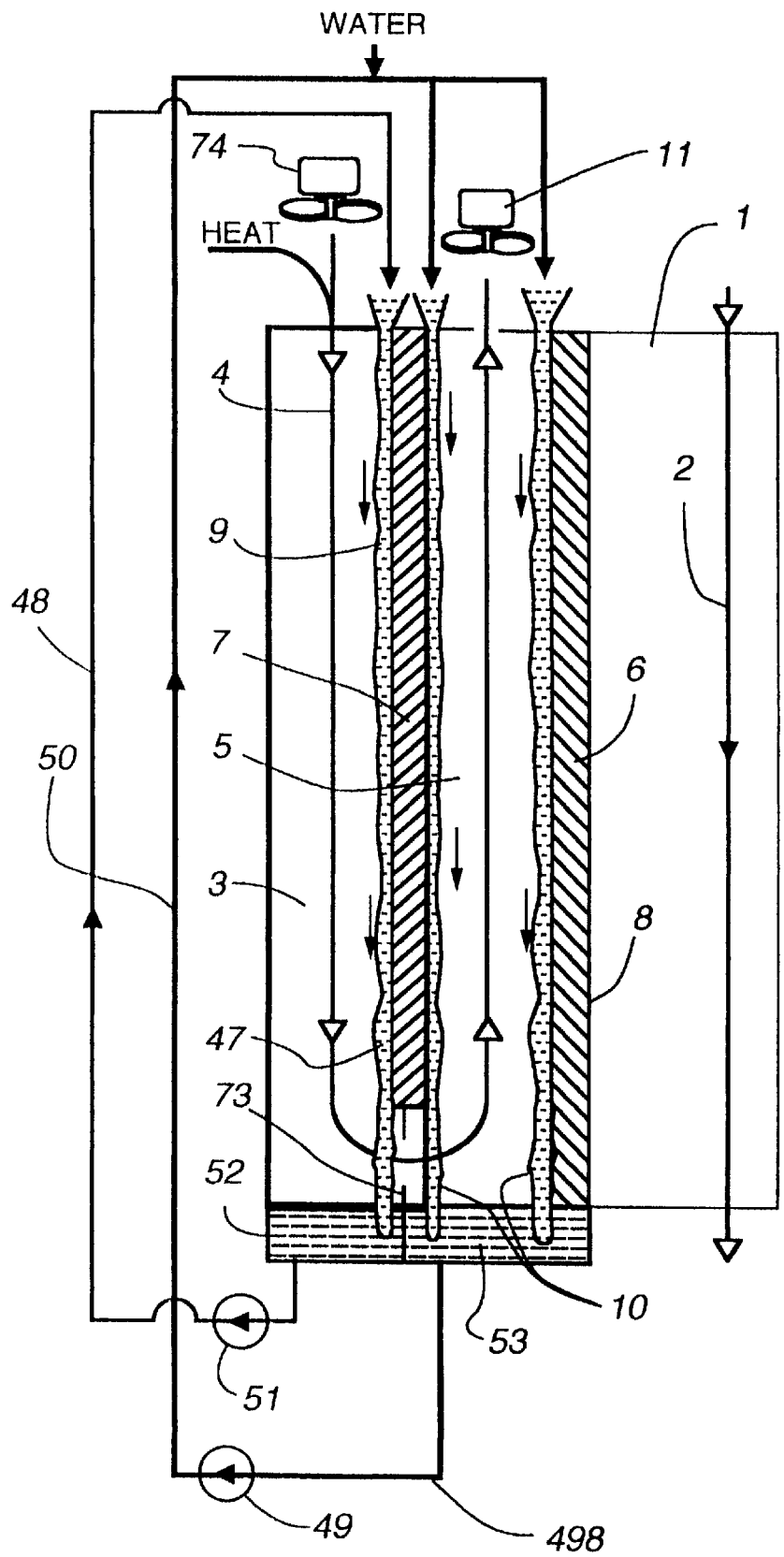
FIG. 21 is a flow diagram with the same general concept as FIG. 17 but where the desiccant dries the air in the Dry Channel 3 and then is directed to the Wet Channel, desiccant from the Wet Channel is returned to the Dry Channel. The Product 2 is cooled in the Product Channel 1.
Figure 22:
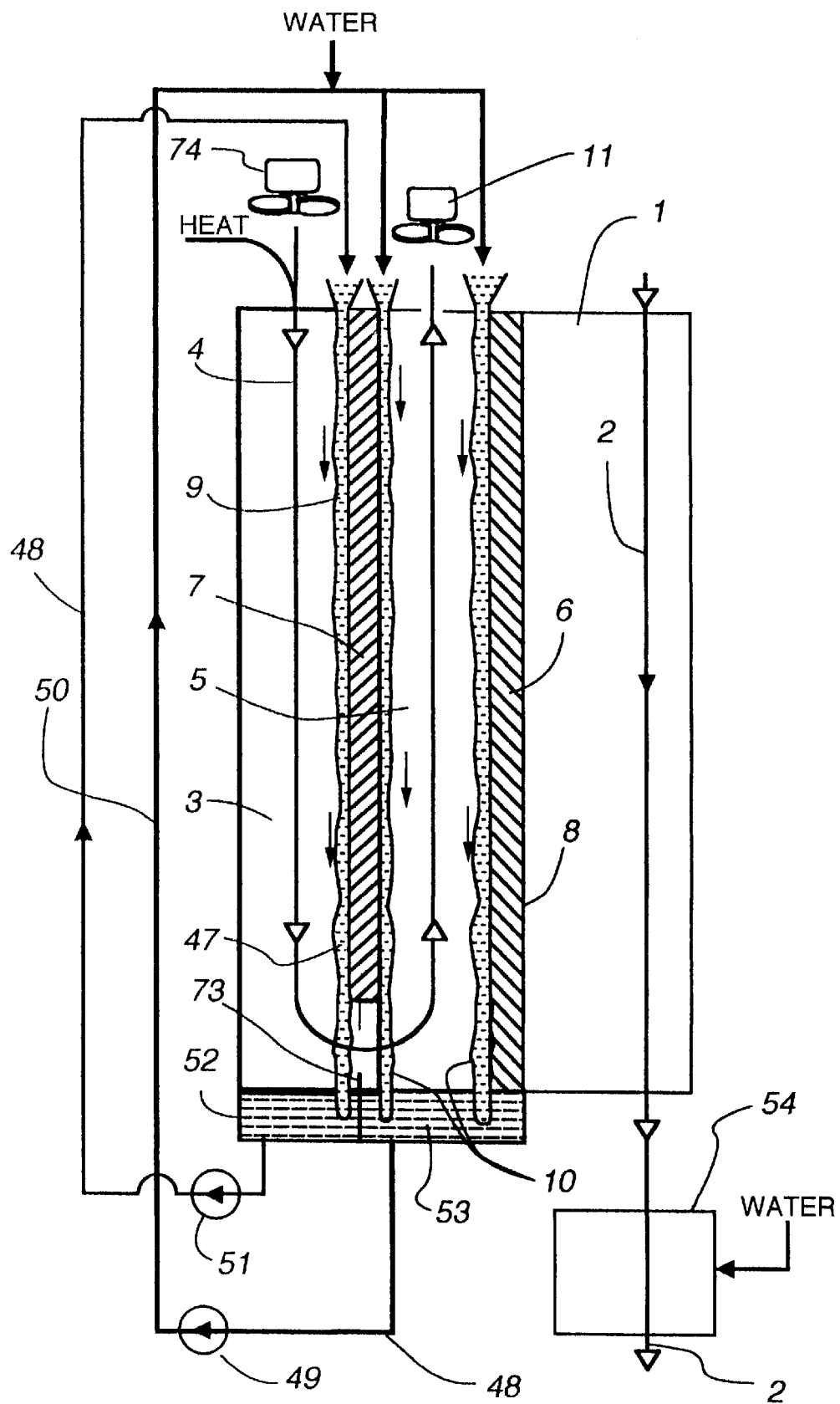
FIG. 22 is a flow diagram similar to FIG. 21, where the Product Fluid 2, for example, outside air, is transported to any kind of an apparatus for direct or indirect evaporative cooling 54.

The present invention has the essential advantages, which are shown in FIGS. 20–22. Herein, the liquid desiccant 10, which flows down along not only the walls 7 and 6 of the Wet Channel 5, but also liquid desiccant 47 flows down along the heat exchange surface 9 of Dry Channel 3 simultaneously. As is clear from FIG. 20 Working Air 4, for example, outside air is directed along Dry Channel 3 in contact with liquid desiccant 47. As the desiccant 47 dries the Working Air 4 the heat of absorption is transferred to heat exchange wall 7. In so doing, the Working Air 4 is cooled, reduced in moisture content and then it is turned to the Wet Channel 5. In Wet Channel 5 it flows counter currently in contact with the regenerating liquid desiccant 10 that absorbs this heat. To create the needed vapor pressure difference between the Dry Channel 3 and the Wet Channel 5 a large pressure difference between the Dry Channel 3 and the Wet Channel 5 is caused by a pressure reduction baffle 73, a forced draft fan 74, and a induced draft fan 11. Liquid desiccant 47, after it's passing along Dry Channel 3, (see FIG. 20) increases its temperature and moisture, and it is drained into tray 52. Hereafter, it is directed by the pump 51 (via the pipe 50) to the Wet Channel 5, where this liquid desiccant flows down in the manner of the moving film 10. Liquid desiccant 10, after it's passing along the Wet Channel 5, reduces its temperature and moisture and it is selected to the tray 53 for the Wet Channel 5. Hereafter, it is directed by the pump 49 (via the pipe 48) to Dry Channel 3, where this liquid desiccant flows down in the manner of the moving film 47. The parameters of the incoming desiccant 47 to Dry Channel 3 (low temperature and moisture) help to improve the absorption process. Product Fluid 2 is directed to the Product Heat Exchanger 39 for heat exchange contact with liquid desiccant 10. Liquid desiccant 10 is directed from the heat exchange apparatus 39 by the pump 49 (via the pipe 48) to Dry Channel 3. FIG. 21 is like FIG. 20 except a Product Channel 1 is used in lieu of a Product Heat Exchanger 39, (see FIG. 20.

To increase the Product cooling capacity the Working Air 4 can be heated prior to entering or moving through Dry Channel 3 and water added to desiccant 10 before Wet Channel 5.

Product 2 air may need to be further cooled in a separate evaporative cooling apparatus 54 as shown in FIG. 22.

Figure 23:
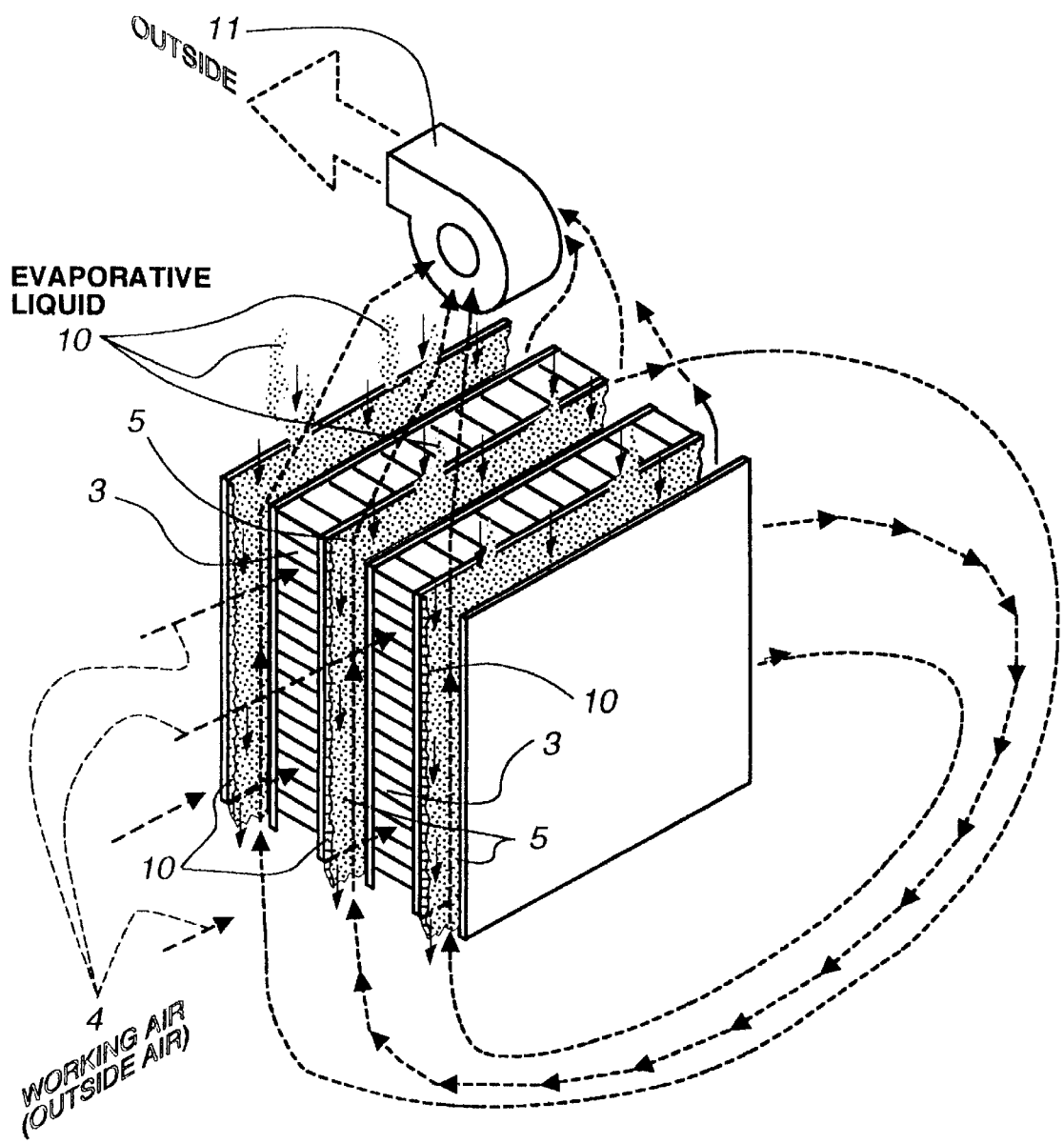
FIG. 23 shows cross flow direction of motion between the Working Air 4 in the Dry Channel 3 and the Working Air 4 in the Wet Channel 5.

FIGS. 1–22 illustrate the direction of movement of the Working Air 4 in Dry Channel 3 or the Product Fluid 2 in the Product Channel 1 is parallel and in counter flow of the direction of movement of the Working Air 4 in the Wet Channel 5. The channels must be parallel however they can be in cross flow or some mix between cross and counter flow. For example, FIG. 23 shows cross flow directions between flows of the Working Air 4 in Dry Channel 3 and the Wet Channels 5. From a strict thermodynamic standpoint counter flow is more efficient however, there are many designs that are more economical to fabricate and the geometry more easily to work with when using cross flow.

Figure 24:
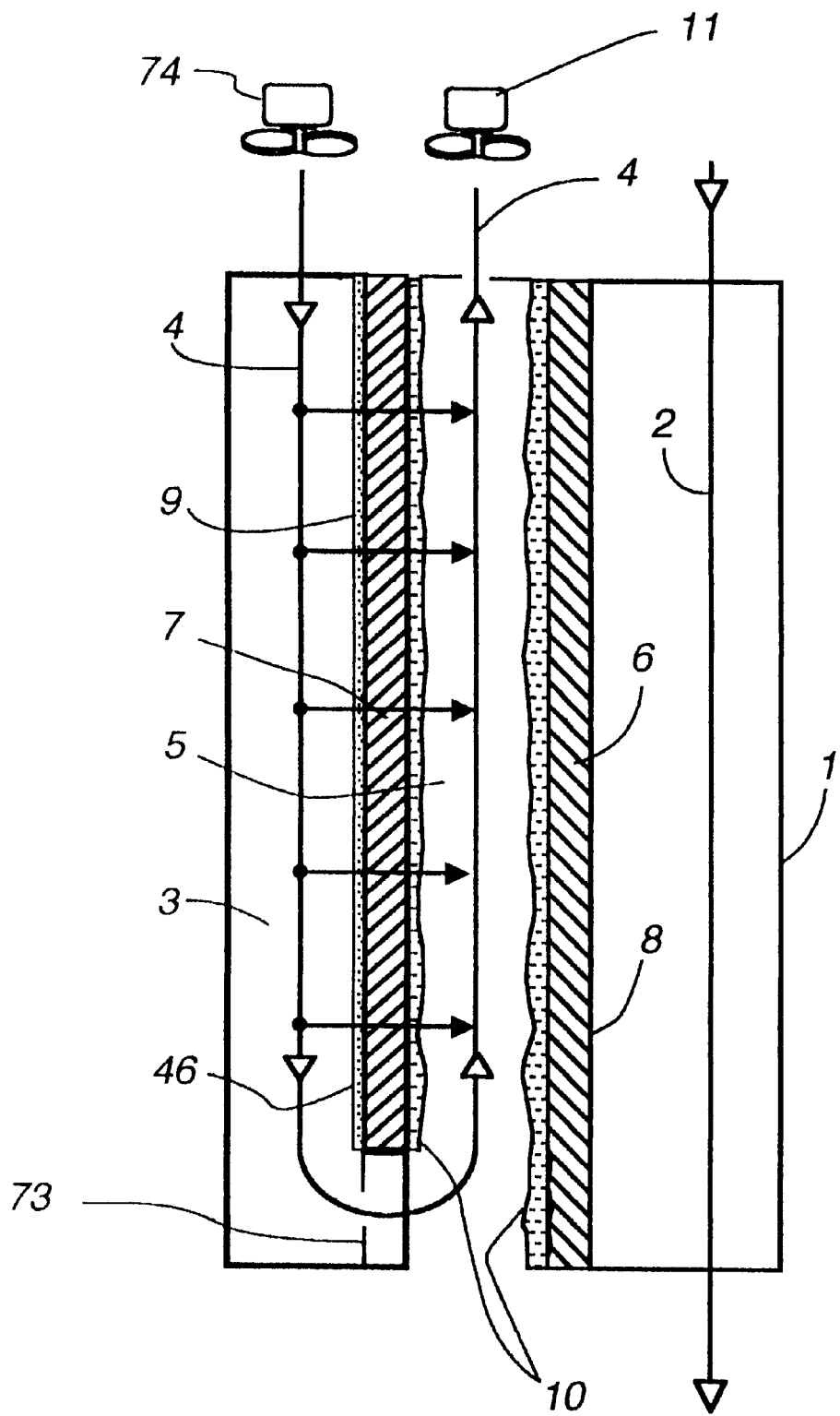
FIG. 24 illustrates an example of a flow diagram, where working air 4 is redirected from the Dry Channel 3 into and through the Wet Channel 5.

FIG. 24 illustrates an example of a flow diagram of the present method, where Working Air 4 is redirected from the Dry Channel 3 into and through the Wet Channel 5, for example, through a plurality of spaced perforations or permeable pores formed in the heat exchange surface 9 of the working membrane 7.

This action can help to increase the coefficient of heat transfer between flows of the Working Air 4 in the Dry 3 and Wet 5 Channels. Also, it can better help to transport absorbed water by solid desiccant material 46 (see FIGS. 6–9 and 9a) from the Dry 3 to the Wet 5 Channels.

Figure 25:
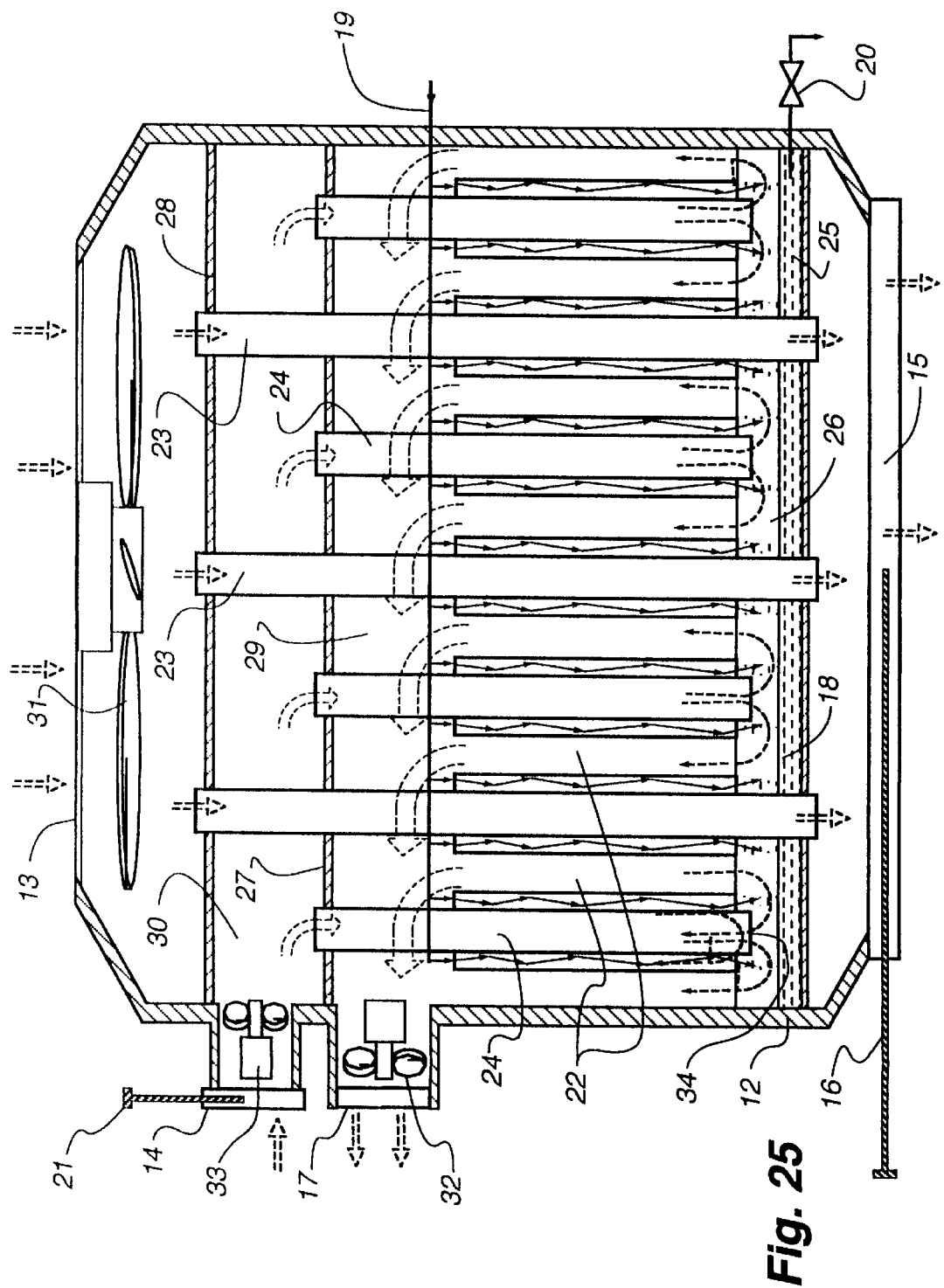
FIG. 25 is a schematic view of the heat exchange apparatus for effecting the method in accordance with the present invention (FIGS. 1, 4, 5, 6, 7, 8, 9, 11), where: a jacket 12, inlet and outlet connections for the Product Fluid 13 and 15, inlet and outlet connections for the Working Air 14 and 17, adjustable dampers-16 and 21, tray for liquid from the Wet Channel 18, liquid distributor for the Wet Channel 19, valve for selection of liquid from the Wet Channel 20, the Wet Channels 22, the Product Channels for the Product Fluid 23, the Dry Channels for the Working Air 24, baffle-boards 25, 27 and 28, blind chamber 26, chambers 29 and 30, fan for the Product Fluid 31, induced draft fan for the Working Air 32, forced draft fan 33, baffle 34.

The heat exchange apparatus with multiple channels for effecting the method, according to the invention (see FIGS. 1, 2, 6–11 and 17–19), where the moving liquid film 10 flows down only along the Wet Channel 5), is shown in FIG. 25. This apparatus comprises a jacket 12 with an inlet connection 13 for the Product Fluid and an inlet connection 14 with an adjustable damper 21 for Working Air provided at one end of a jacket 12. At the other end of a jacket 12 provisions are made for an outlet connection 15 for the Product Fluid supplied to the consumer.

The outlet connection 15 is fitted with an adjustable damper 16. Close to the inlet connection 13 of the Product Fluid provision is made for an outlet connection 17 for exhaust Working Air. The connection 17 is made in the upper portion of a jacket 12, which will become clear from subsequent description. In a jacket 12 are placed through Wet Channels 22 for Working Air with a wetted capillary-porous material on surfaces, which flows down liquid, for example, liquid desiccant. The liquid desiccant is served in Wet Channels 22 from a liquid distributor 19. Thereto as well in a jacket 12 are placed through Product Channels 23 and through Dry Channels 24 limited by a moisture-proof material.

In the exemplary embodiment of the invention shown in FIG. 25 the Wet Channels 22 and also the Product Channels 23 and Dry Channel 24 are made in the form, for example, of plates or corrugated plates.

It follows from FIG. 25, that Working Air passes through Dry Channel 24 and then Wet Channel 22 with the Product Channel 23 between them and in heat transfer contact with both. The Product Channels 23 project with one end outside the limits of the Wet Channels 22 and are fixed by these ends in a baffle-board 25 to form a blind chamber 26 limited by the baffle-board 25 and the walls of a jacket 12. The blind chamber 26 provides a tray 18 for liquid, for example, water after its passing through the Wet Channels 22. The valve 20 uses for output of this liquid.

Further consideration of FIG. 25 shows that the Dry Channels 24 for Working Air and the Product Channels 23 also project beyond the Wet Channels 22 on the side of the inlet connection 13 of the Product Fluid and these projecting ends at the channels 23 and 24 are secured in the baffle-boards 27, 28. Herewith a chamber 29 for removing waste Working Air is formed between the end surface of the Wet Channels 22 and the baffle-board 27 and a chamber 29 communicates with the outlet connection 17. Moreover, a chamber 30 is formed between the baffle-boards 27 and 28, which communicate with the inlet 14 for introducing Working Air, for example, the atmospheric air, although this chamber is optional and in the present exemplary embodiment of the invention is dictated only by the convenience of arranging the apparatus components.

Mounted in the inlet connection 13 is a fan or pump 31 (FIG. 25) for forcing the product, for example air or some other gas or liquid through the Product Channels 23. It is obvious that a pump or any other means known to those familiar with transporting other media can be used to inject or convey liquid. It is clear from FIG. 25 that in the outlet connection 17 there is mounted an induced draft fan 32 for transporting Working Air.

The above-described heat exchange apparatus operates as follows. A fan 31 injects the Product Fluid, for example, air, thus conveying the air along the Product Channels 23. As the air passes along these channels, it is cooled without a change in its moisture content and then via the outlet connection 15 is supplied to the consumer. The adjustable damper 16 regulates the flow rate of the Product Fluid.

Working Air is simultaneously fed via the inlet connection 14 where the forced draft fan 33 can be mounted, in the given case it is the atmospheric air, flowing along the Dry Channels 24. At the section of the Dry Channels 24 being in the chamber 29 this air is previously cooled do to the heat exchange with the air being fed to the chamber 29 from the Wet Channels 22. Here, the air moves in cross-flow with respect to the channels 24 and is pulled off by a fan 32 to the atmosphere via the outlet connection 17.

Having previously cooled in the channels 24 at their sections arranged in the chamber 29, the flow of Working Air is further cooled as it moves along the channels 24 to account for the evaporation of water, in the Wet Channels 22.

In the blind chamber 26 the Working Air is turned 180 degrees, as is shown by arrows in FIG. 25, to head for the Wet Channels 22.

As the Working Air flows in the Wet Channels 22, heat exchange occurs with the Product Fluid moving in counter-current in the Dry Channels 24 and the Product Channels 23 via the walls of these channels. As a result of such processes the flow of the product and Working Air is cooled to the dew point of the air entering without a change in its moisture content. The Working Air in the Wet Channels 22 is heated (as a result of heat extraction from Product fluid (air) being cooled in the Product Channels 23 and from itself after passing through the Dry Channels 24,) and is moistened (as a result of water evaporation in the Wet Channels 22.) Thereupon, the Working Air, coming out of the Wet Channels 22, enters the chamber 29, where it cross-currently comes into a heat exchange with both fluid (air) being cooled in the channels 23 and the incoming flow of the Working Air in the channels 24. A result of this heat exchange contact such that the both flows (in Product Channels 23 and Dry Channels 24) are precooled, while the Working Air (being removed from the Wet Channels 22) is heated about to temperatures of incoming flows and in this condition is pulled off into the atmosphere by means of a fan 32 via the outlet connection 17.

In the heat exchange apparatus, according to the invention, the product fluid and the Working Air are separated from each other. This makes it possible to transport the Working Air with the aid of an induced draft fan 32, which enables one to use the head loss in the cooling flow to intensify evaporation cooling.

Because during the passage of the Working Air first along the dry 24 and after the wet 22 channels as a result of the effect of different aerodynamic resistance, its head will decline (particularly, after the turn 180 degrees into the Wet Channels 22) the pressure drop in the flow core results, respectively, in a decline of partial pressure of water vapor. This, in turn, enhances the effect of moisture evaporation into the flow, which leads to greater efficiency of cooling the fluid.

In the above-described heat exchange apparatus it is expedient that the Dry Channels 24 for Working Air be restricted to a developed heat exchange surface. This brings about a more substantial decline in the head of the Working Airflow increasing the efficiency of cooling, and simultaneously increases the specific value of the heat exchange surface, which reduces the overall dimensions of the apparatus and enhances the efficiency of cooling.

Figure 26:
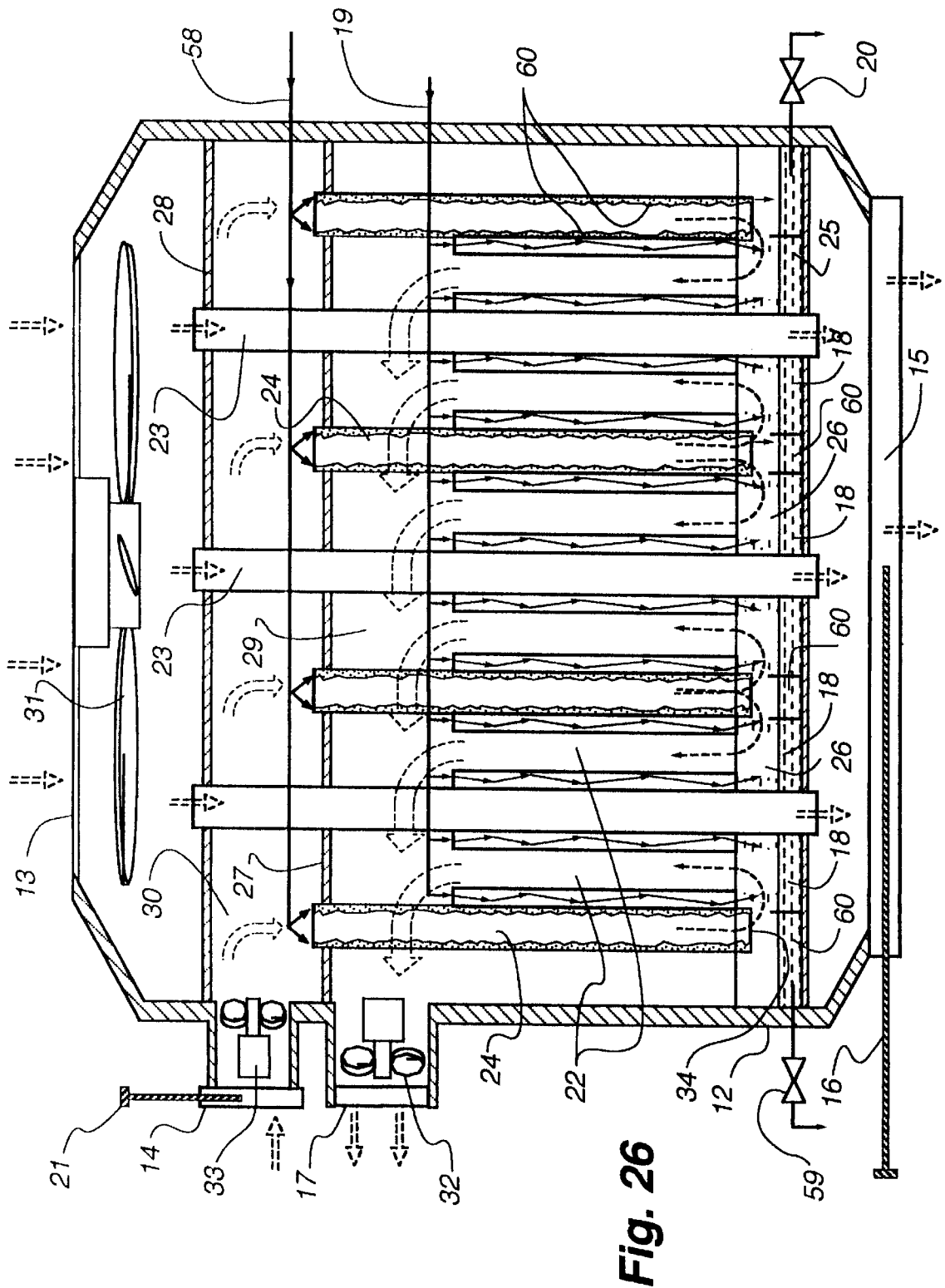
FIG. 26 is a schematic view similar to FIG. 24 heat exchange apparatus wherein the Dry Channels is equipped with a liquid distribution system-58 for the Dry Channels-24, tray for this liquid-60, valve-59.

FIG. 26, is like FIG. 25, (see also FIGS. 3–5, 12–15, 20–22,) where the moving liquid film 10 flows down not only along the Wet Channels 5 but also along the Dry Channels 3 simultaneously but with the added ability to wet the Dry Channels with a liquid such as a desiccant. In the same way the Product Channel and could have this wetting system added also. The dry channels have had wetting system 58 added with liquid collection system added 60 with piping and valve 59 to be used for redistribution.

There are several designs where the increase in pressure drop between the Dry and Wet Channels is desirable and to that end a pressure reduction baffle 34 is shown. The most obvious uses for this baffle are when the regeneration of the desiccant is used in the Wet Channels 22 and a drying desiccant is used in the Dry Channels. The combination of pressure reduction baffle 34 and forced draft fan 33 cause a large difference in pressure and therefore large difference in vapor pressure between the Wet and Dry Channels allowing the drying of air in the Dry Channel 24 and evaporation of water from the air in the Wet Channel 22. This same pressure difference may also be needed when a solid desiccant is used in the Dry Channel and water is used in the Wet Channel as pressure difference will create a vapor drive from the Dry to Wet Channel forcing moisture through the porous walls from the solid desiccant to be evaporated in the Wet Channel.

Sometimes, it is expedient when the plates of the heat exchange apparatus between the Dry 24 and Wet 22 Channels for Working Air comprise the perforations or permeable pores.

The present heat exchange apparatuses can work alone and together with conventional heat and mass exchange equipment depending on the claims of the present method would like to be realized.

In the present method of indirect-evaporation cooling this heat exchange apparatus, according to the invention, it is possible to cool air, gas, refrigerant, steam, liquid, and any material, which can be transported along channels. The different variations of this apparatus are useful because they permit cooling gaseous, liquid and dispersed materials without high-energy cost for cooling. In additional all these materials can be cooled lower then the dew point temperature of outside air without using high energy cost of complex refrigeration machines. This process of cooling in the present method of indirect-evaporation cooling and a heat exchange apparatus uses significantly less energy due to the use of natural psychometric difference of temperature and moisture of outside air.

COMPARATIVE EXAMPLE

For purposes of illustrating the advantages of the apparatus and method disclosed herein, the applicants take the results using the apparatus disclosed in Russian patent No. 2046257 (Maisotsenko) [copied in U.S. Pat. No. 5,187,946]. We compare the results using the apparatus shown in FIG. 3 in Table #1.

The materials as used in the test of FIG. 3 are a wicking material on the wet surfaces made of cellulose blended fiber sold by Ahlstrom Paper Group, Grade 1278 (0.2969 mm thickness), backed, for the dry side of the membrane, with 5 mil Mylar callendered with an adhesive (appropriate for the material).

This material is the best readily available product, though other materials may be used, such as an absorbent material, such as polypropylene with a; polyethylene coating which was available from Ahlstrom as Grade 4002. Another combination, using polyethylene coating on the Grade 1278, would have additional advantages.

The advantage of Grade 1278 is that it is specifically a wicking material with a high klem test of approximately 55, compared to polypropylene whose klem test is 26.

If the working air 4 enters the apparatus at 122 $M^3$/hour having a dry-bulb temperature (tdb) of 35.4° C. and a wet-bulb temperature (twb) of 22.8° C. The stream of the working air 4 flows through the dry channel 3 where the desiccant 47 (aqueous lithium chloride solution with concentration 43.4%) absorbs water vapor from the working air 4 and transmits heat through the wall 7 to the water 10 of the wet channel 5 evaporating into the working air 4.

The continual cooling of the desiccant 47 in channel 3 increases the working air 4 drying capabilities.

Simultaneously the product air 2 (outside air) enters the product channel 1 at 125 $M^3$/hour having the same temperature parameters like working air 4. The stream of the product air 2 after its passing through product channel 1 having a dry-bulb temperature (tdb) of 10.1° C. and wet-bulb temperature (twb) of 8.2° C. The aerodynamic losses of the total air streams from inlet (for this test was used one fan) to discharge is 127 Pa. A 25 watt fan propels the air. The total surface area of the heat transfer surface is 0.672 $M^2$.

For purposes of comparison, the apparatus disclosed in Russian patent No. 2046257 (and the same U.S. Pat. No. 5,187,946) was used to cool a stream of ambient air (working air) having the same approximate thermal characteristics. An incoming working air flow of 240 $M^3$/hour having a dry-bulb temperature 35.1° C. and a wet-bulb temperature of 22.6° C. was directed to an equal surface area of 0.672 $M^2$. After the dry channel pass the incoming flow is split with the redirected secondary air stream of 119 $M^3$/hour going to the wet channel resulting in 121 $M^3$/hour (as a product air) directed to the user. When this apparatus was employed as taught, aerodynamic losses of 105 Pa resulted and necessitated a 22 watt fan. The product air directed to the user had a dry-bulb temperature of 19.1° C. and a wet-bulb temperature of 17.6° C. By comparing the claimed and known methods we can see that we can get much less temperature of the product air (10.1° C.) compare with 19.1° C. using known method. The following Table #1 summarizes the above comparison and additional regime with another parameters of outside air wherein the initial air is drier. Likewise, the method as claimed here results in lower temperature of the product air.

TABLE 1

| | Air Flow $M^e$/hour | | Temperature, degree C.° | | | | Pressure Drop, Pa | Energy for Fan, watt |
|---|---|---|---|---|---|---|---|---|
| | | | Working Air Inlet | | Product Air Outlet | | | |
| | Working Air | Product Air | tdb | twb | tdb | twb | | |
| 1. Claimed Method (see FIG. 3) | 122 | 125 | 35.4 | 22.8 | 10.1 | 8.2 | 127 | 25 |
| Known (*) Method U.S. Pat. No. 5,187,946 Or Russian Patent No. 2046257 | 240 | 121 | 35.1 | 22.6 | 19.1 | 17.6 | 105 | 22 |
| 2. Claimed Method (see FIG. 3) | 125 | 127 | 26.5 | 16.7 | 7.7 | 4.0 | 127 | 25 |
| Known (*) Method U.S. Pat. No. 5,187,946 Or Russian Patent No. 2046257 | 239 | 120 | 26.1 | 16.3 | 14.8 | 11.9 | 105 | 22 |

The Comparison illustrates the benefits of indirect cooling and by a single flow, first pre-cooled in the dry channel, and dehumidified, and then used in the wet channel to remove heat into latent heat in the vapor. The product is indirectly cooled by the wet channel flow.

What is claimed is:

1. A method of indirect-transpiration cooling, which comprises:
   a) passing a Product Fluid in a product channel;
   b) Having a surface with said product channel, having a wall created by a first side of a first membrane,
   c) Having a Dry Channel with one of its walls being a first side of a second membrane,
   d) Having a Wet Channel comprised of at least two walls, one being the second side of the first membrane and the second being the second side of the second membrane,
   e) Having the walls of the Wet Channel being supplied with evaporative liquid,
   f) Passing working fluid first through the Dry Channel, and then in counter flow to this direction, through the Wet Channels,
   g) Having a heat exchange mechanism between the Working Fluid in the Wet Channel, and the Product Fluid in the Product Channel,
   h) Having a heat exchange mechanism between the working fluid in the Dry Channel and the Wet Channel.

2. A method according to claim 1, wherein the Working Air flow is being induced from the Wet Channel.

3. A method according to claim 2, wherein a pressure drop is created between the Dry and Wet Channels.

4. A method according to claim 1, wherein the Working Air path along the Dry Channel wall is not equal to that along the Wet Channel wall.

5. A method according to claims 1, a Product Heat Exchanger exchanges heat between the Product and excess Evaporative fluid from the Wet Channel.

6. A method according to claims 1, wherein a liquid desiccant flows over the Dry Channel wall of the second membrane.

7. A method according to claim 6, wherein liquid desiccant, after its passing over the Dry Channel, is directed outside the apparatus for regeneration, and subsequent reuse.

8. A method according to claim 1, wherein the second membrane is porous between the Dry and Wet Channels to allow working fluid to pass.

9. A method according to claim 1, wherein some part of the Working Air, after passing through the Dry Channel, is withdrawn and used as the Product Fluid being cooled.

10. A method according to claim 1, wherein the walls of the second membrane of the Dry Channels has solid desiccant material.

11. A method according to claim 1 wherein at least one of the walls of the Wet Channel are wetted by liquid desiccant.

12. A method according to claim 1, wherein the Evaporative Liquid is a liquid fuel that wets the Wet Channel.

13. A method according to claim 12, wherein the Working Air passing through the Wet Channel creates a fuel-air mixture which is directed to an internal combustion engine.

14. A method according to claim 1, wherein exhaust gas from an engine is used to heat the Working Air before it enters the Wet Channel.

15. A method according to claim 7, the regenerator, uses heat of exhaust gas of an engine.

16. A method according to claim 12 wherein water is added to fuel and is used as the Evaporative Liquid in the Wet Channel.

17. A method according to claim 1, wherein the heat exchange surfaces mechanism are one or more heat pipes, with evaporator section located in the Dry Channel and condenser section in the Wet Channel, and evaporation section in the Product Channel and the condensation section in the Wet Channel.

18. A method according to claim 1, wherein the Evaporative Liquid is a liquid desiccant which is on the Wet Channel walls.

19. A method according to claim 18, wherein the Working Air, before passing along the Dry Channel, is exposed to the liquid desiccant, and then this liquid is directed to the Wet Channel as the Evaporative Liquid.

20. A method according to claim 18, wherein the liquid desiccant is re-circulated to the Wet Channel.

21. A method according to claim 19, wherein at least some part of the Working Air, after its contact with a desiccant is directed to the Dry Channel, and the remainder is used for Product air.

22. A method according to claim 18, wherein at least some of the liquid desiccant after its passing along the Wet Channel, is directed to the Dry channel, and at least some of the liquid desiccant after it's passing along the Dry Channel, is directed to the Wet Channel.

23. A method according to claim 1, wherein the Product Fluid, after cooling is transported to an apparatus for cooling of another material.

24. A method according to claim 1, wherein the Evaporative Liquid is heated.

25. A method according to claim 1, wherein the Working Air is heated.

26. A method according to claim 1, wherein the direction of movement of the fluids runs by a means other than counter flow between the flow in the Wet Channel and the Dry Channel and the Product Channel.

27. A method, according to claim 1 wherein Working Air is redirected from the Dry Channel into and through the Wet Channel, through a plurality of spaced perforations or pores formed in the second membrane.

28. A heat exchange apparatus wherein:
   a) There is a means to cool working fluid by evaporation of an evaporative liquid,
   b) A means to conduct heat from a product fluid to the working fluid,
   c) A means where Dry working fluid, before it starts evaporating the evaporative fluid, is pre cooled by heat transfer with the working fluid that is cooling by way of evaporating of an evaporative liquid.

29. A heat exchange apparatus comprising:
   a) A jacket containing separate passages for Working Fluid and Product Fluid,
   b) Inlet and outlet for Working Fluid
   c) Inlet and outlet for Product Fluid,
   d) Working fluid passes through a first passage, with a Dry Channel first, and a second Wet Channel,
   e) The Product Fluid passage shares a first membrane with the Wet Channel part of the Working Fluid passage, its first side being one wall of the product passage way, and its opposing second side being one wall of the Wet Channel,
   f) A second membrane separates the Dry Channel from the Wet Channel of the Working Fluid passageway,
   g) A communication passageway for the Working Fluid from the Dry Channel to the Wet Channel,
   h) At least one wall of the Wet Channel is supplied with an evaporative liquid, i) The flow of the Working Fluid in the Dry Channel is counter to the flow of the Working Fluid in the Wet Channel, j) The flow of the Product Fluid is counter to the flow of the Working Fluid in the Wet Channel, k) Having a heat exchange mechanism between the Dry Channel and the Wet Channel, l) Having a heat exchange mechanism between the Product Channel and the Wet Channel.

30. The apparatus of claim 29 wherein the heat transfer mechanisms are the first and second membrane.

31. The apparatus of claim 29 wherein the heat transfer mechanisms are heat pipes.

32. The apparatus of claim 29 wherein the evaporative liquid is fuel.

33. The apparatus of claim 29 wherein the evaporative liquid is liquid desiccant.

34. The apparatus of claim 29 wherein the second membrane is solid desiccant.

35. The apparatus of claim 29 wherein the Product Channel is separate and passes in heat transfer connection with an excess evaporative liquid from the Wet Channel.

36. The apparatus of claim 29 wherein there are more than one set of Dry, Wet and Product Channels.

37. The apparatus of claim 29 wherein the evaporative liquid is fuel with water.

38. The apparatus of claim 29 wherein the evaporative liquid is liquid desiccant which first flows over the Dry Channel side of the second membrane.

39. The apparatus of claim 29 wherein the working fluid is heated before it enters the Wet Channel.

40. The apparatus of claim 29 wherein the membranes have multiple passageways for fluid to pass from the Dry Channel to the Wet Channel.

* * * * *

UNITED STATES PATENT AND TRADEMARK OFFICE
CERTIFICATE OF CORRECTION

PATENT NO. : 6,497,107 B2
DATED : December 24, 2002
INVENTOR(S) : Maisotsenko et al.

It is certified that error appears in the above-identified patent and that said Letters Patent is hereby corrected as shown below:

<u>Drawings,</u>
Sheet 21, Figure 20, delete "48" and insert -- 50 -- (as shown);
Sheet 21, Figure 20, delete "50" and insert -- 48 -- (as shown);
Sheet 21, Figure 20, Pipe 50 leads from tray 52 and is directed by pump 51 via pipe 50 to the inlets on either side of fan 11. Pipe 48, directed by pump 49 via pipe 48 goes to the inlet closest to fan 74. This is how it is shown in the originally filed informal drawings and now in the newly submitted corrected formal drawings. The formal drawings submitted on October 9, 2001 were incorrect showing heat pipe 50 as heat pipe 48 and heat pipe 48 as heat pipe 50 and also showing heat pipe 48 (50) only going to the inlet closest to fan 74 and heat pipe 50 (48) going to the inlets on either side of fan 11. This should have been just the opposite;

Sheet 22, Figure 21, delete "48" and insert -- 50 -- (as shown);
Sheet 22, Figure 21, delete "498" and insert -- 48 --;
Sheet 22, Figure 21, delete "50" and insert -- 48 -- (as shown).
Sheet 22, Figure 22, Pipe 50 leads from tray 52 and is directed by pump 51 via pipe 50 to the inlets on either side of fan 11. Pipe 48, directed by pump 49 via pipe 48 goes to the inlet closest to fan 74. This is how it is shown in the originally filed informal drawings and now in the newly submitted corrected formal drawings. The formal drawings submitted on October 9, 2001 were incorrect showing heat pipe 50 as heat pipe 48 and heat pipe 48 as heat pipe 50 and also showing heat pipe 48 (50) only going to the inlet closest to fan 74 and heat pipe 50 (48) going to the inlets on either side of fan 11. This should have been just the opposite;

Signed and Sealed this

Thirty-first Day of August, 2004

JON W. DUDAS
*Director of the United States Patent and Trademark Office*